US012425802B2

(12) United States Patent
Mittek et al.

(10) Patent No.: US 12,425,802 B2
(45) Date of Patent: Sep. 23, 2025

(54) SYSTEM AND METHOD FOR PROXIMITY-BASED ANALYSIS FOR OPERATIONAL TRACKING

(71) Applicant: REALMFIVE, Inc., Lincoln, NE (US)

(72) Inventors: Mateusz Mittek, Lincoln, NE (US); Austin Bontrager, Seward, NE (US); Zach Conrad, Sioux Falls, SD (US); Brant Burkey, Denton, NE (US)

(73) Assignee: REALMFIVE, Inc., Lincoln, NE (US)

( * ) Notice: Subject to any disclaimer, the term of this patent is extended or adjusted under 35 U.S.C. 154(b) by 73 days.

(21) Appl. No.: 18/410,787

(22) Filed: Jan. 11, 2024

(65) Prior Publication Data

US 2024/0223993 A1    Jul. 4, 2024

Related U.S. Application Data

(63) Continuation-in-part of application No. 18/228,520, filed on Jul. 31, 2023, now abandoned, which is a continuation of application No. 17/347,309, filed on Jun. 14, 2021, now Pat. No. 11,716,588, which is a continuation of application No. 16/666,186, filed on Oct. 28, 2019, now Pat. No. 11,039,269, which is a
(Continued)

(51) Int. Cl.
| | |
|---|---|
| G08B 1/08 | (2006.01) |
| G06F 16/90 | (2019.01) |
| G06Q 50/02 | (2012.01) |
| G08B 21/18 | (2006.01) |
| H04L 51/02 | (2022.01) |
| H04W 4/021 | (2018.01) |
| H04W 4/38 | (2018.01) |

(52) U.S. Cl.
CPC ............ *H04W 4/021* (2013.01); *G06F 16/90* (2019.01); *G06Q 50/02* (2013.01); *G08B 21/18* (2013.01); *H04L 51/02* (2013.01); *H04W 4/38* (2018.02)

(58) Field of Classification Search
CPC ......... H04W 4/021; H04W 4/38; G06F 16/90; G06Q 50/02; G08B 21/18; H04L 51/02
See application file for complete search history.

(56) References Cited

U.S. PATENT DOCUMENTS

| 7,073,314 B2 | 7/2006 | Beck et al. |
| 7,480,564 B2 | 1/2009 | Metzler et al. |

(Continued)

*Primary Examiner* — Toan N Pham
(74) *Attorney, Agent, or Firm* — Suiter Swantz IP

(57) ABSTRACT

A system for proximity-based analysis for operational tracking includes one or more processors. The one or more processors receive event blocks, which include information associated with an operation. The one or more processors are further configured to generate a set of queue cycles based on the received event blocks. Each queue cycle includes at least a starting and ending event block. The one or more processors are further configured to perform a correlation analysis between the set of queue cycles and the set of evidence artifacts, where each artifact is compared to each queue cycle and assigned a correlation score for each artifact-queue cycle pair. The one or more processors are further configured to determine a representative queue cycle by identifying the queue cycle with the highest quality score, which will be stored in a database for subsequent retrieval along with the corresponding evidence artifact.

39 Claims, 34 Drawing Sheets

Related U.S. Application Data continuation of application No. 16/012,669, filed on Jun. 19, 2018, now Pat. No. 10,462,603, which is a continuation-in-part of application No. 15/215,315, filed on Jul. 20, 2016, now abandoned.

(60) Provisional application No. 63/438,326, filed on Jan. 11, 2023, provisional application No. 62/196,584, filed on Jul. 24, 2015, provisional application No. 62/194,521, filed on Jul. 20, 2015.

(56) References Cited

U.S. PATENT DOCUMENTS

| | | |
|---|---|---|
| 8,254,351 B2 | 8/2012 | Fitzner et al. |
| 9,392,746 B2 * | 7/2016 | Darr .................... A01D 43/087 |
| 10,462,603 B1 | 10/2019 | Tippery et al. |
| 11,039,269 B2 | 6/2021 | Tippery et al. |
| 2012/0259537 A1 | 10/2012 | Schmidt et al. |
| 2015/0225923 A1 * | 8/2015 | Wallace ................. E02F 9/264 |
| | | 701/50 |
| 2015/0351320 A1 | 12/2015 | Takahara et al. |
| 2016/0110502 A1 | 4/2016 | Bronson et al. |
| 2016/0119770 A1 | 4/2016 | Ryu et al. |
| 2016/0147962 A1 | 5/2016 | Vollmar et al. |
| 2016/0157275 A1 | 6/2016 | Matthews |
| 2016/0275580 A1 * | 9/2016 | Uechi .............. G06Q 10/06315 |

* cited by examiner

FIG. 13

HARVEST PROGRESS | DAILY PROGRESS BY FIELD

| Member Name | Field Name | Max T. | Septe... 22 23 24 | October 3 4 5 6 7 8 9 10 11 12 13 14 15 16 17 18 19 20 21 22 23 24 25 26 27 28 29 30 31 | Nov. 1 2 |
|---|---|---|---|---|---|
| Producer 1 | Field 1 | 98.8% | | | |
| | Field 2 | 98.7% | | | |
| | Field 3 | 92.6% | | | |
| | Field 4 | 98.1% | | | |
| | Field 5 | 98.4% | | | |
| | Field 6 | 98.6% | | | |
| | Field 7 | 98.5% | | | |
| Producer 2 | Field 8 | 98.4% | | | |
| Producer 3 | Field 9 | 98.6% | | | |
| Producer 4 | Field 10 | 95.4% | | | |
| Producer 5 | Field 11 | 98.1% | | | |
| | Field 12 | 98.2% | | | |
| Producer 6 | Field 13 | 98.8% | | | |
| | Field 14 | 98.3% | | | |
| | Field 15 | 98.6% | | | |
| | Field 16 | 98.3% | | | |
| | Field 17 | 98.5% | | | |
| | Field 18 | 98.8% | | | |
| | Field 19 | 98.6% | | | |
| | Field 20 | 98.6% | | | |
| | Field 21 | 98.6% | | | |
| Producer 7 LLC | Field 22 | 98.7% | | | |
| | Field 23 | 98.4% | | | |
| Producer 8 | Field 24 | 97.9% | | | |
| | Field 25 | 98.3% | | | |
| Producer 9 | Field 26 | 97.5% | | | |
| Producer 10 | Field 27 | 98.2% | | | |
| | Field 28 | 98.6% | | | |
| | Field 29 | 97.4% | | | |
| | Field 30 | 98.4% | | | |
| | Field 31 | 98.6% | | | |
| Producer 11 | Field 32 | 92.0% | | | |
| | Field 33 | 92.3% | | | |

FIG. 17 Cont.

SYSTEM AND METHOD FOR PROXIMITY-BASED ANALYSIS FOR OPERATIONAL TRACKING

CROSS-REFERENCE TO RELATED APPLICATION

The present application claims the benefit under 35 U.S.C. § 119 (e) of U.S. Provisional Application Ser. No. 63/438,326, filed Jan. 11, 2023, and also constitutes a continuation-in-part (CIP) of U.S. patent application Ser. No. 18/228,520, filed Jul. 31, 2023, now Abandoned, which is a continuation application of U.S. patent application Ser. No. 17/347,309, now U.S. Pat. No. 11,716,588, filed Jun. 14, 2021, which is a continuation application of U.S. patent application Ser. No. 16/666,186, filed Oct. 28, 2019, now U.S. Pat. No. 11,039,269, which is a continuation application of U.S. patent application Ser. No. 16/012,669, filed Jun. 19, 2018, now U.S. Pat. No. 10,462,603, which constitutes a continuation-in-part patent application of U.S. patent application Ser. No. 15/215,315, filed Jul. 20, 2016, now Abandoned, which is a regular (non-provisional) patent application of U.S. Provisional Application No. 62/194,521, filed Jul. 20, 2015, and U.S. Provisional Application No. 62/196,584, filed Jul. 24, 2015, whereby all of the above-listed patent applications are incorporated by reference herein in their entirety.

TECHNICAL FIELD

The present disclosure relates generally to the analysis of correlated geospatial data and, more particularly, to a proximity-based analysis for operational tracking which provides insights into the spatial relationships and interactions among various elements within a given operational context.

BACKGROUND

Logistics, a multifaceted operation encompassing the storage, transport, and coordination of materials, presents challenges in maintaining and understanding properties associated with logistics transactions. These properties include source, destination, quality, volume, time of departure, time of arrival, chain of custody, transport characteristics, storage conditions, and correlation of various inventories. However, many of these critical aspects are either manually recorded or verbally communicated, leaving room for errors, fraud, delays, and non-standard reporting.

Efficiently tracking resources and costs is crucial in both agricultural and non-agricultural production settings. In the realm of farm production, the difficulty lies in accurately monitoring inventory, input costs, and machine usage across different farm areas, from the point of origin to consumption or utilization. The current reliance on manual tracking methods results in a labor-intensive and inefficient process. Therefore, it would be desirable to provide a method and system that cure the shortfalls of the previous approaches identified above.

SUMMARY

A system is disclosed, in accordance with one or more embodiments of the present disclosure. In one illustrative embodiment, the system includes a server comprising a memory and one or more processors. In another illustrative embodiment, the one or more processors receive one or more signals from one or more sensors, the one or more signals associated with one or more characteristics of one or more entities, the one or more characteristics including time-stamp and geospatial data. In another illustrative embodiment, the one or more processors generate one or more event blocks based on the received signals. In another illustrative embodiment, the one or more processors generate a set of queue cycles, where each queue cycle includes at least a starting event block candidate and an ending event block candidate. In another illustrative embodiment, the one or more processors receive a set of evidence artifacts associated with an occurrence of a specific event of a particular process. In another illustrative embodiment, the one or more processors perform a correlation analysis between the set of queue cycles and the set of evidence artifacts, where each artifact is compared to each queue cycle to assign a correlation score for each evidence artifact-queue cycle pair. In another illustrative embodiment, the one or more processors determine a representative queue cycle by identifying the queue cycle having the highest correlation score. In another illustrative embodiment, the one or more processors store the representative queue cycle and the corresponding evidence artifact in a database for subsequent retrieval.

A system is disclosed, in accordance with one or more embodiments of the present disclosure. In one illustrative embodiment, the system includes one or more sensors to collect data associated with one or more characteristics of one or more entities. In another illustrative embodiment, the system includes a server comprising a memory and one or more processors. In another illustrative embodiment, the one or more processors receive one or more signals from one or more sensors, the one or more signals associated with one or more characteristics of one or more entities, the one or more characteristics including time-stamp and geospatial data. In another illustrative embodiment, the one or more processors generate one or more event blocks based on the received signals. In another illustrative embodiment, the one or more processors generate a set of queue cycles, where each queue cycle includes at least a starting event block candidate and an ending event block candidate. In another illustrative embodiment, the one or more processors receive a set of evidence artifacts associated with an occurrence of a specific event of a particular process. In another illustrative embodiment, the one or more processors perform a correlation analysis between the set of queue cycles and the set of evidence artifacts, where each artifact is compared to each queue cycle to assign a correlation score for each evidence artifact-queue cycle pair. In another illustrative embodiment, the one or more processors determine a representative queue cycle by identifying the queue cycle having the highest correlation score. In another illustrative embodiment, the one or more processors store the representative queue cycle and the corresponding evidence artifact in a database for subsequent retrieval.

A method is disclosed, in accordance with one or more embodiments of the present disclosure. In one illustrative embodiment, the method may include, but is not limited to, receiving one or more signals from one or more sensors, the one or more signals associated with one or more characteristics of one or more entities, the one or more characteristics including time-stamp and geospatial data. In another illustrative embodiment, the method may include, but is not limited to, generating one or more event blocks based on the received one or more signals. In another illustrative embodiment, the method may include, but is not limited to, generating a set of queue cycles, where each queue cycle comprises at least a starting event block candidate and an ending event block candidate. In another illustrative embodiment, the method may include, but is not limited to, receiving a set of evidence artifacts associated with an occurrence of a specific event of a particular process. In another illustrative embodiment, the method may include, but is not limited to, performing a correlation analysis between the set of queue cycles and the set of evidence artifacts, where each artifact is compared to each queue cycle to assign a correlation score for each evidence artifact-queue cycle pair. In another illustrative embodiment, the method may include, but is not limited to, determining a representative queue cycle by identifying the queue cycle having a highest correlation score. In another illustrative embodiment, the method may include, but is not limited to, storing the representative queue cycle and the corresponding evidence artifact in a database for subsequent retrieval.

It is to be understood that both the foregoing general description and the following detailed description are exemplary and explanatory only and are not necessarily restrictive of the invention as claimed. The accompanying drawings, which are incorporated in and constitute a part of the specification, illustrative embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1A:
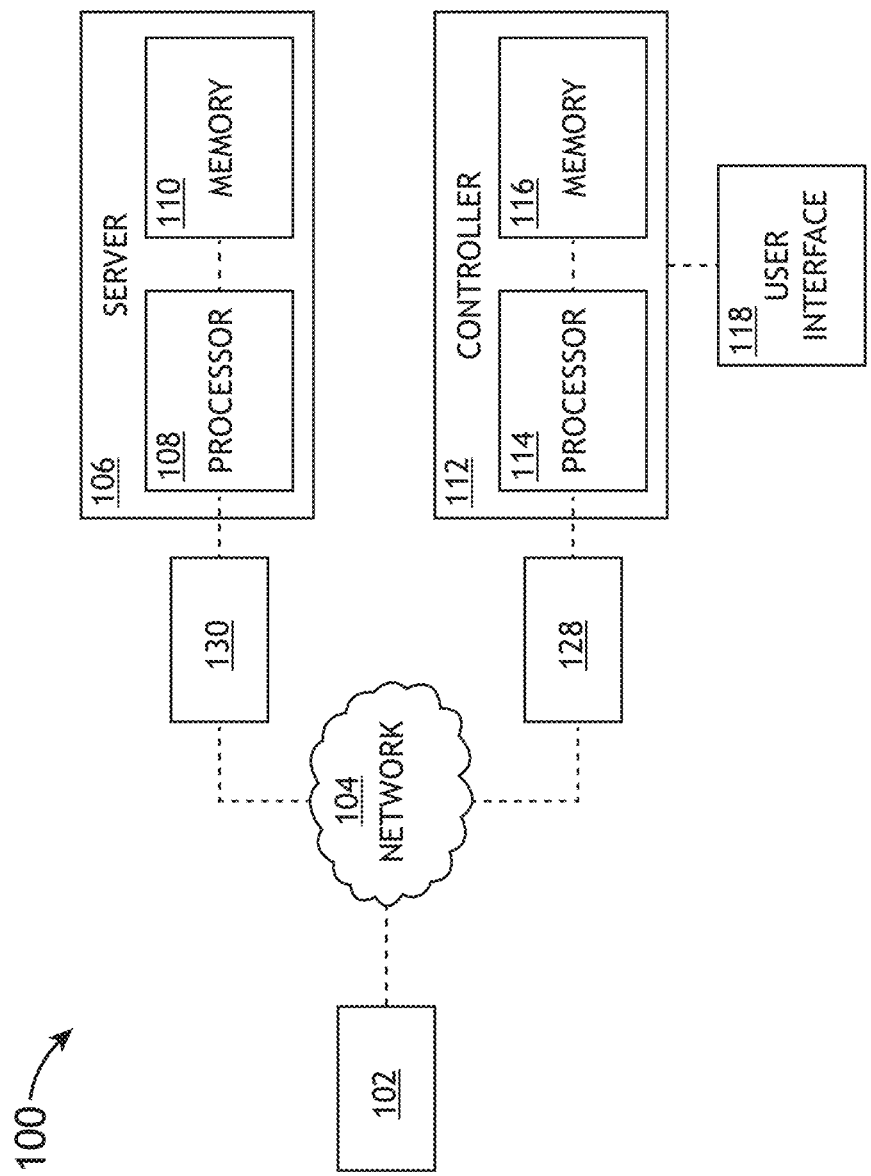
FIG. 1A illustrates a system for providing operational tracking insights, in accordance with one or more embodiments of the present disclosure, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

In embodiments, the system analyzes correlated geospatial data to provide automated operational context. For example, the system may receive data from one or more data sources such as, but not limited to, GPS location data (e.g., obtained from dedicated tracking devices, vehicle telemetry from third party servers, nearby equipment, and digital applications), geofences delineating areas of interest, material properties (e.g., density), vehicle-specific attributes (e.g., maximum speed, weight, volume, vibration level and weight capacity), driver-related details, equipment properties, weather conditions (e.g., ambient temperature, humidity, wind speed), and volume properties. By way of another example, the system may leverage the range of data from the one or more data sources to generate one or more operational insights such as, but not limited to, queues and queue cycles, automated contract load assignments (CLA), chain of custody evidence, value chain evidence, transportation quality, estimated yield and contract progress, equipment usage utilization, equipment activity, CLA progress, and asset tracking.

In embodiments, the system assumes that data from tracked equipment is received at random rates, with each data point being timestamped by an originating device. For instance, the device may undergo periodic time synchronization with an external reference clock. As a result, data points such as GPS locations may not be directly comparable across multiple devices without additional processing. To identify event blocks spanning multiple pieces of tracked equipment, the system aligns the data on a time axis through linear interpolation of position. This ensures the feasibility of determining proximity or whether both pieces of equipment are observing the same phenomena simultaneously.

Embodiments of the present disclosure are directed to a system and method for proximity-based analysis for operational tracking. In embodiments, the system provides digital logistics and spatial relationships between many different entities and communication devices, including people, equipment, and places. As such, it will be advantageous to define various terms prior to describing embodiments of the present disclosure.

The term "entity," as it applies to the present disclosure, refers to any person and/or object which may be tracked and identified for proximity sensing throughout the present disclosure. Entities may include any person or object intended to participate in the proximity sensing of the present disclosure including, but not limited to, people, vehicles, tractors, combines, trailers, tillage equipment, fuel tanks, and the like.

The term "scanner," as it applies to the present disclosure, refers to a transceiver device which is placed on, within, or near an entity that emits a unique identifier (ID) that may be used to uniquely identify the entity, scans for the unique ID's transmitted by beacons and other scanners, and logs and/or transmits collected data with a time stamp and location to a remote database. Similar to beacons, scanners may optionally collect information from an entity with which they are related. For example, a scanner placed on or within a tractor may be able to collect information regarding the tractor including, but not limited to, tractor fuel level, tractor speed, and the like. A scanner may optionally collect other information transmitted from beacons to identify properties of the beacons (e.g., beacon battery health, and the like) or entities with which the beacons are connected (e.g., fuel tank level, vehicle type, and the like).

In the context of the present disclosure, the term "tracker" may refer to the use of various electronic devices to capture properties of mobile equipment. For example, the electronic devices may include, but are not limited to, a plurality of sensors 102. In embodiments, the plurality of sensors 102 includes a real-time clock (RTC), which facilitates accurate timekeeping with at least 1-second resolution; a GPS receiver, which enables the capture of absolute position, time (derived from satellite data), and velocity; and a radio transceiver, which permits communication with the system components external to the mobile equipment.

In the context of the present disclosure, the term "load" may refer to the batches of inventory picked up from a site or storage unit, subsequently transported, and ultimately either consumed through a production operation or transferred via a delivery operation. For instance, a load may be identified based on an association with a specific operation or a proximity to equipment engaged in a specific operation.

The term "events," as they apply to the present disclosure, refer to any basic, fundamental data elements representing instantaneous moments of time when certain properties are satisfied. For example, events may be used to signify the beginning or the end of an event block. By way of another example, events may include asynchronous single occurrences of exceptions and incidents including, but not limited to, a driver exiting the vehicle, a vehicle leaving a geofence, a truck leaving a field, a vehicle that has stopped moving, and the like.

In the context of the present disclosure, the term "event blocks" refers to abstractions of time frames (e.g., intervals) characterized by distinct beginning and end events. These event blocks serve as a mechanism for converting raw data into composable features. Within each event block, a comprehensive set of features (e.g., metadata) is captured, providing detailed information about what, when, and how something was happening during that specific interval.

In the context of the present disclosure, the term "queue" may refer to the duration in which a device resides within a particular segment of a queue cycle process. For example, queues are confined to a singular, cyclical process referred to as the queue cycle 204. Notably, various perspectives can be derived from the overall process, restricting the analysis to a specific scope of queues.

The terms "geo-fence," "geo-fenced boundary," "geo-fenced area," and like terms, as they apply to the present disclosure, refer to any geographical area or region. By way of example, a geo-fenced area may be defined by a series of GPS coordinates, or may be defined as a region relative to a particular entity. It is contemplated that a user may define one or more geo-fenced boundaries as areas in which the user desires to track groups of entities or operations. For example, a user may define the outer perimeter of a field as a first geo-fenced boundary defining a first geo-fenced area. In this same manner, the user may define the perimeter of a second field as a second geo-fenced boundary defining a second geo-fenced area. By way of another example, a geo-fenced area may be defined as the region within a specified distance of an entity. In this regard, it is contemplated that a geo-fenced area may be stationary or mobile. It is contemplated that defining particular geo-fenced areas may allow a user to track groups of entities and operations to particular areas, thereby allowing the user to track operation times, equipment costs, inventory usage, and the like to particular areas.

Relationships between many devices on the farm currently have minimal electronic integration and/or interaction. Such devices will be referred to for the remainder of this document as "entities." Examples of agricultural "entities" include several categories of machines and sensors. For example, entities may include self-propelled machines, such as, but not limited to, tractors, combines, forage harvesters, self-propelled sprayers, trucks, pickups, cars, or other personal vehicles. By way of another example, entities may include agricultural implements, such as, but not limited to, seeding and tillage equipment, planting equipment, hay harvesting equipment, and grain carts. By way of another example, entities may include stationary machines, such as, but not limited to, pivot irrigation systems, grain handling systems, livestock buildings (e.g., confinement facilities, and the like) and agricultural buildings (e.g., shops, machine sheds, and the like). By way of another example, entities may include energy generation machines, such as, but not limited to, diesel-powered generators, wind energy generators, and the like. By way of another example, entities may include, but are not limited to, miscellaneous devices/systems (e.g., in-field sensors, personal mobile phones, etc.), agricultural inventory (e.g., seed containers, chemical/fertilizer containers, etc.), livestock (e.g., individual hogs, cattle, chickens, etc.) livestock equipment (e.g., livestock holding areas, loading chutes, scales, etc.), transport equipment (e.g., cargo containers, belt loaders, etc.), warehouse inventory (e.g., pallets, shipping containers, forklifts, shelves, etc.), raw materials (e.g., felled trees, mined minerals, etc.), construction equipment (e.g., trailers, pumps, excavators, etc.) and the like.

While much of the present disclosure focuses on "entities" in the agricultural context, this is done merely for illustrative purposes, and is not to be understood as a limitation on the present disclosure. In this regard, it is noted herein that the systems and methods of the present disclosure may be useful and may be implemented in a wide variety of environments outside of the agricultural context.

FIG. 1A illustrates a system 100 for proximity-based analysis of operational tracking, in accordance with one or more embodiments of the present disclosure. In one embodiment, system 100 includes one or more sensors 102, a network 104, a server 106, a controller 112, and a user interface 118.

It is contemplated herein that the one or more sensors 102 may be communicatively coupled to the server 106. For example, the one or more sensors 102 may be configured to transmit one or more signals to the server 106, in which the one or more signals include time-stamped information associated with one or more characteristics of one or more entities.

In embodiments, the one or more sensors 102 are configured to transmit entity ID signals. Entity ID signals may be encoded with data including, but not limited to, unique entity identifiers (e.g., entity IDs), sensor-based 103 data, and the like. Data collected by the one or more sensors 102 may include data regarding the surrounding environment (e.g., temperature, pressure, humidity, and the like), data associated with the entities with which the one or more sensors 102 are associated, and the like. For example, if one of the one or more sensors 102 were associated with a tractor, the sensor 102 may collect data regarding the speed of the tractor, the fuel level of the tractor, the mileage of the tractor, and the like. In this regard, it is contemplated that entity ID signals may include data collected by the one or more sensors 102.

In embodiments, the one or more sensors 102 includes a controller including one or more processors and memory. The memory may be configured to store data of system 100 including, but not limited to, collected data, data received via entity ID signals, and the like. In another embodiment, the one or more sensors 102 may include GPS circuitry configured to receive GPS positional information. In this regard, one or more processors of the one or more sensors 102 may be configured to extract GPS positional information received from the GPS circuitry to determine the GPS position of the one or more sensors 102 or an entity associated with the one or more sensors 102.

In embodiments, the one or more sensors 102 are directly or indirectly coupled to a server 106 and a controller 112 via a network 104. In this regard, the one or more sensors 102 may include network interface circuitry. It is noted herein that the network interface circuitry may include any network interface for interacting with a network 104 known in the art. In another embodiment the one or more sensors 102 may be configured to transmit network signals to the network 104. In one embodiment, network signals may include any data stored in the memory of the one or more sensors 102. For example, network signals may include, but are not limited to, data associated with entity ID signals received from other sensors 102, data collected by the one or more sensors 102, and the like.

It is noted that a network interface (not shown) of the one or more sensors 102 may include any network interface device suitable for interfacing with network 104. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, LTE, WiFi protocols, RF, LoRa, and the like.

In embodiments, network 104 may be configured to receive network signals transmitted by the one or more sensors 102. It is noted herein that network 104 may include any wireless and/or wireline network protocol known in the art. For example, the network 104 may include, but is not limited to, an internet or an intranet (e.g., LAN, WLAN and the like). By way of another example, network 104 may include a cloud-based architecture.

In embodiments, system 100 includes a server 106 including one or more processors 108 and memory 110. In another embodiment, server 106 is communicatively coupled to the one or more sensors 102 via network 104 via a network interface 130. The network interface 130 may include any network interface device known in the art. For instance, the network interface 130 may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WIMAX, 4G, 4G LTE, 5G, Wi-fi protocols, and the like. By way of another example, server 106 may include a cloud-based architecture.

In embodiments, one or more processors 108 of server 106 are configured to execute a set of program instructions stored in memory 110. In embodiments, the one or more processors 108 are configured to carry out one or more steps of the present disclosure.

Figure 1B:
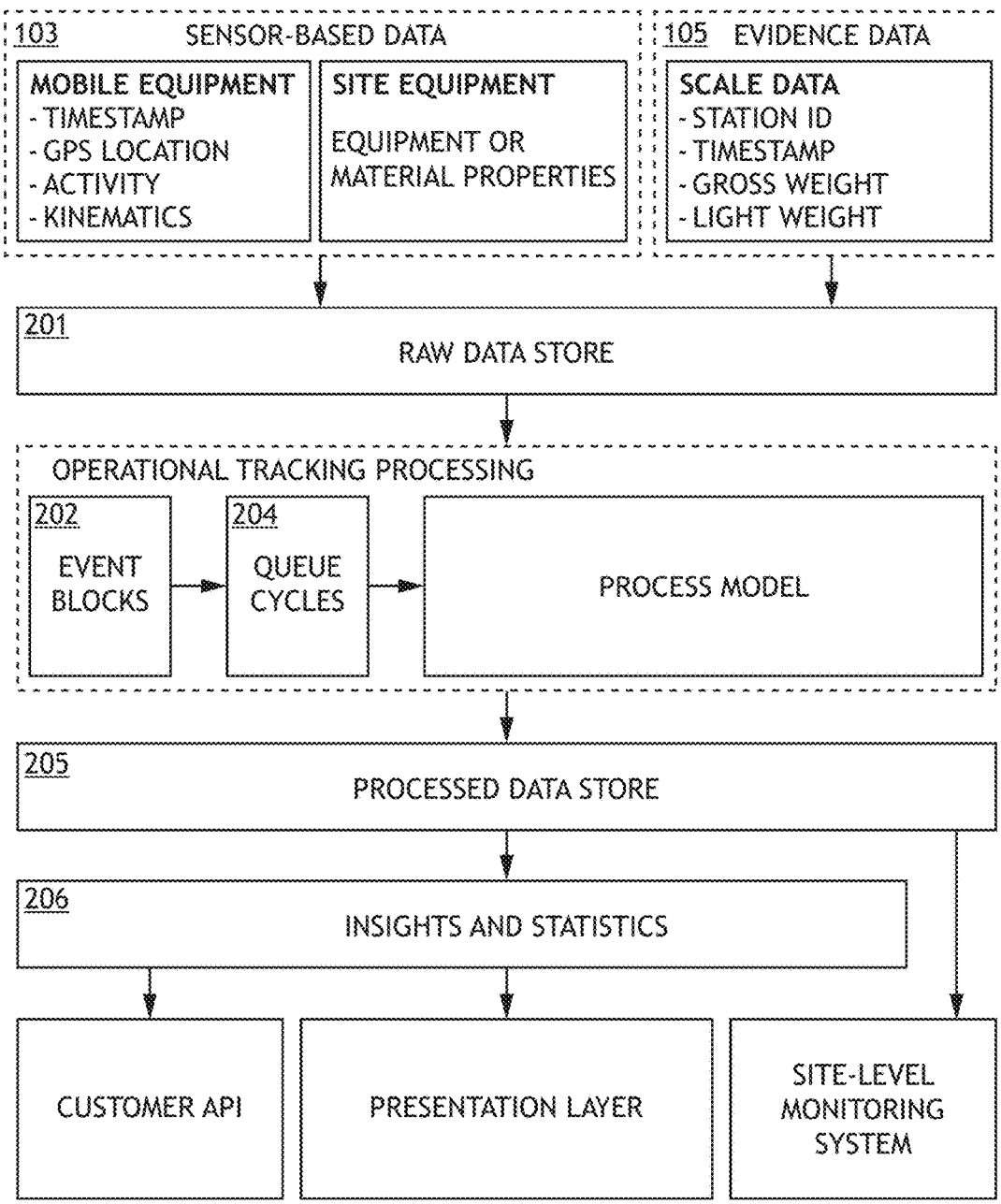
FIG. 1B illustrates a simplified block diagram of a system architecture for providing operational tracking insights, in accordance with one or more embodiments of the present disclosure.

FIG. 1B illustrates a simplified block diagram of an architecture of the network 104 of system 100 for providing operational tracking insights, in accordance with one or more embodiments of the present disclosure.

In embodiments, system 100 includes an architecture for network 104 which facilitates the communication between one or more sensors 102, servers 106 and the like. In embodiments, the network 104 architecture may include a raw data store 201. For example, the raw data store 201 may be configured to receive data from the one or more sensors 102. It is noted herein that the one or more sensors 102 may be associated with one or more entities (e.g., mobile equipment, site equipment, and the like). The one or more sensors 102 may sense one or more characteristics associated with the one or more entities including, but not limited to, time-stamped data, GPS location data, activity data, kinematics data, equipment or material properties data, or the like. The sensor-based data 103 may be received by the raw data store 201 through any wired or wireless signal known in the art including, but not limited to, radio signals, WiFi signals, Bluetooth signals, 3G signals, 4G signals, 4G LTE signals, 5G signals, and the like. By way of another example, the raw data store 201 may be configured to receive data from one or more evidence artifacts 105 (e.g., records, scale tickets, station ID, weight value, and the like). The one or more evidence artifacts 105 may be received through application specific data delivery methods (e.g., application programming interfaces).

In embodiments, the network 104 architecture includes an operational tracking process. In embodiments, the operational tracking process includes the one or more processors 108 configured to cause the server 106 to receive data stored in the raw data store 201. In other embodiments, the one or more processors 108 are configured to generate one or more event blocks 202 based on the received time-stamped data. In other embodiments, the one or more processors 108 are configured to generate a set of queue cycles 204 from the one or more event blocks 202. For example, the one or more queue cycles 204 may include at least a starting event block 302 candidate and an ending event block candidate 304. In other embodiments, the one or more processors 108 are configured to perform a correlation analysis between the set of queue cycles 204 and the set of evidence artifacts 105. For example, each artifact may be compared to each queue cycle 204 and assigned a correlation score for each evidence artifact-queue cycle pair. In other embodiments, the one or more processors 108 determine a representative queue cycle 204 by identifying the queue cycle 204 having the highest correlation score. In other embodiments, the one or more processors 108 store the representative queue cycle 204 and corresponding evidence artifact 105 in a database for subsequent retrieval.

In embodiments, the network 104 architecture includes a processed data store 206. For example, the processed data store 206 may include any data generated through the operational tracking process.

In embodiments, the network 104 architecture includes a step for providing operational tracking insights to a user. For example, one or more processors 108 may be configured to receive data from the processed data store 206 and, based on the received data, provide operational tracking insights to a user. By way of another example, the operational tracking insights may be presented through a customer API, a presentation layer (e.g., web monitoring interface, corporate dashboard, and the like), a sit-level monitoring system, and the like. It is noted herein that the site-level monitoring system may communicate with the processed data store 206 directly or indirectly.

Figure 2:
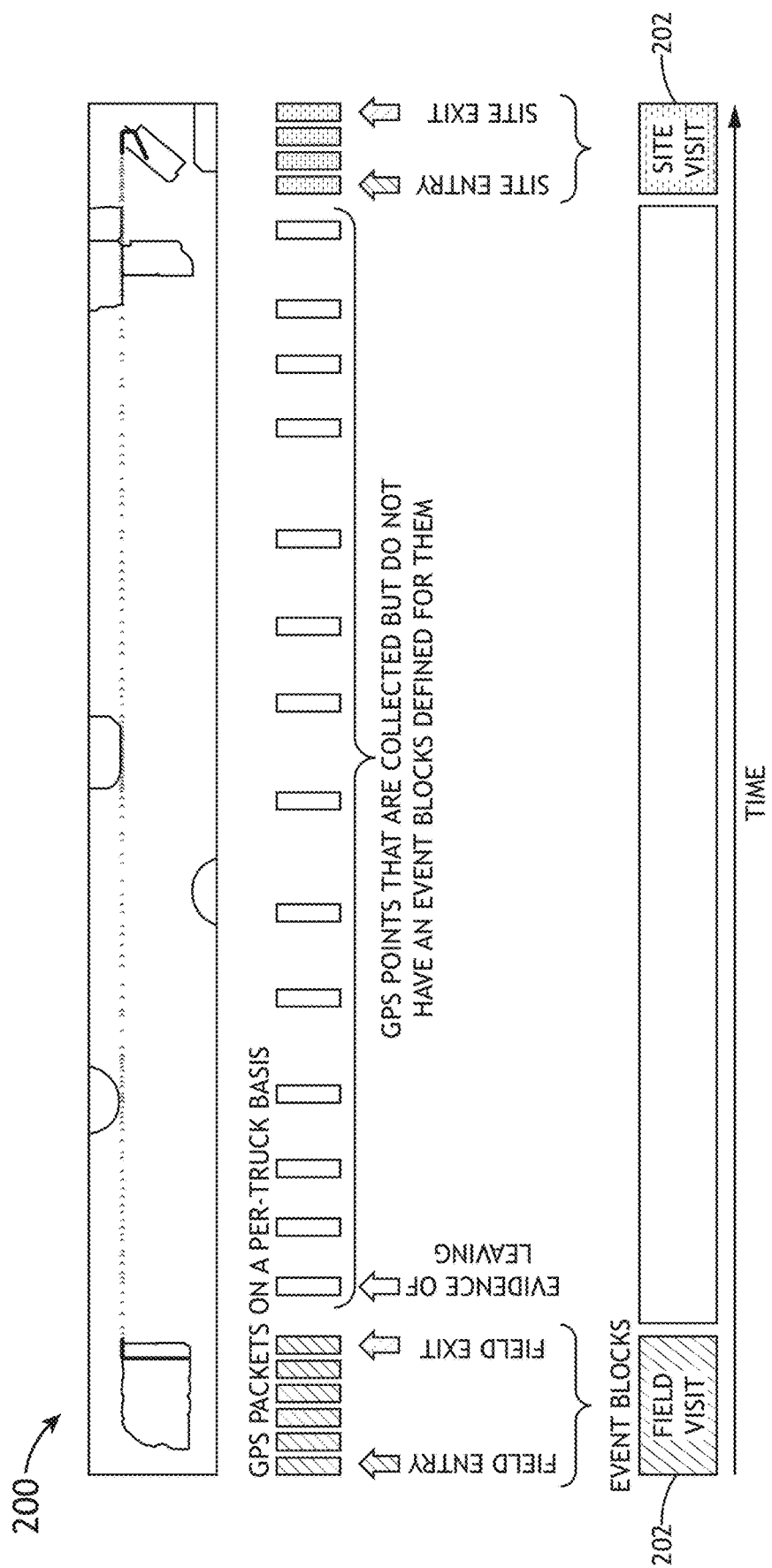
FIG. 2 illustrates a diagram for operational tracking incorporating event blocks, in accordance with one or more embodiments of the present disclosure.

FIG. 2 illustrates a diagram 200 for operational tracking incorporating event blocks 202, in accordance with one or more embodiments of the present disclosure. For example, event blocks 202 are detected and defined in diagram 200 based on a distinct beginning event (e.g., field entry) and end event (e.g., field exit). The event blocks 202 may correspond to a path of a vehicle, which is depicted in the top section of diagram 200. For example, the path may include a route taken by a vehicle from a field to a site. The middle section of diagram 200 may include one or more GPS points established along the path of the vehicle. The one or more GPS points may or may not be displayed regardless of whether there is an event block 202 defined for them or not.

In embodiments, each event block 202 includes a comprehensive set of features. For example, each event block 202 may include a start time and an end time defined using a time zone-aware format (e.g., ISO8601). By way of another example, each event block 202 may include a subject identifier (e.g., a number) which indicates the specific entity determined to undertake the action defined by the event block 202. By way of another example, each event block 202 may include a collection of key-value pairs which describe the properties of the event block 202, which may be referred to as "metadata". By way of another example, the one or more event blocks 202 may encompass parent-child relationships. For instance, child event blocks 303 may correspond to operations that are dependent on specific locations, such as "harvesting in the field" or "unloading at the dock," which creates an assumption that "being in the field" or "at the dock" event blocks 202 are of interest. In such instances, the parent event block 301 may define the start and stop time of the time window in which detection of a child event block 303 occurs. Employing a time window based on the parent event block 301 ensures the alignment of start and end times of the children event blocks 303 with the parent event blocks 301, preventing activities like "harvesting in the field" (child) from starting or ending outside of "being in the field" (parent). It is noted herein that this method may require prior knowledge and assumptions (e.g., field details and on-site specifics) regarding the parent-child relationships.

Figure 3:
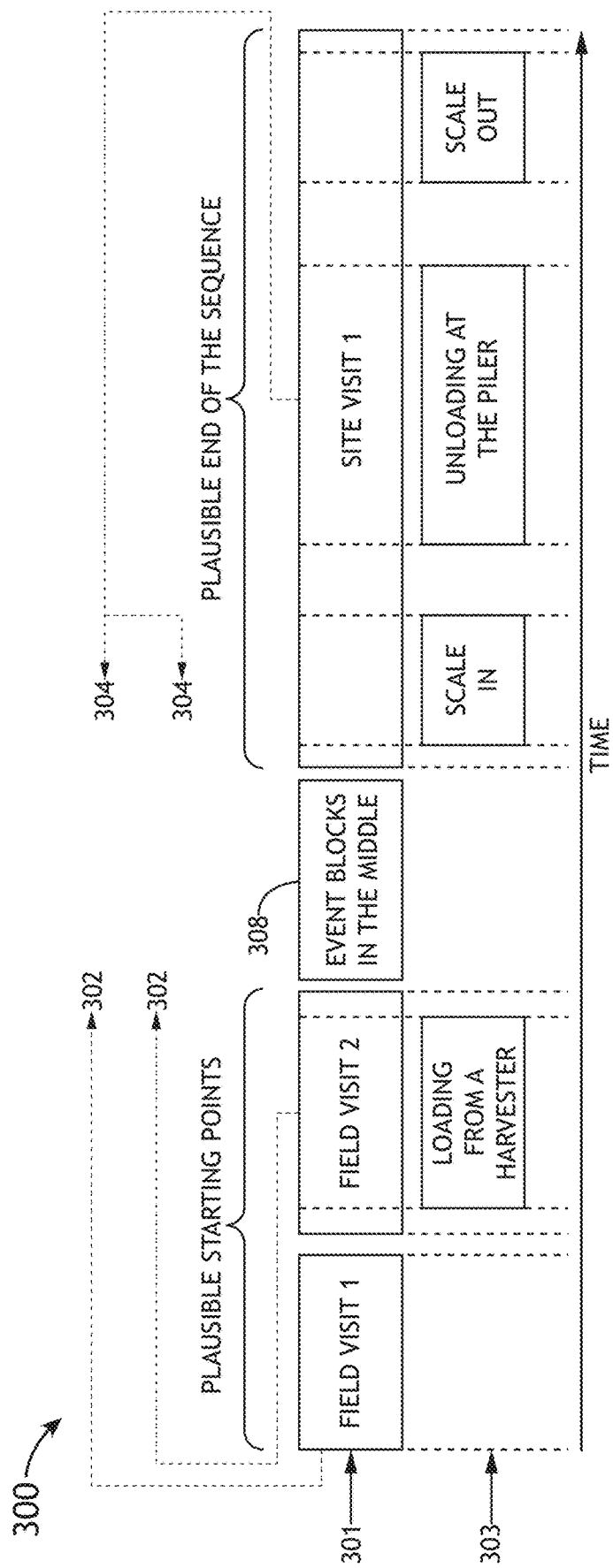
FIG. 3 illustrates a queue cycle of an operation tracked by the system, in accordance with one or more embodiments of the present disclosure.

FIG. 3 illustrates a queue cycle 204 of the system 100 for operational tracking, in accordance with one or more embodiments of the present disclosure.

In embodiments, the system 100 is configured to determine a "queue cycle" 204 associated with a particular operation. In the context of the present disclosure, queue cycles 204 include a sequence of event blocks 202 corresponding to a repeatable series of real-world events capturing a single iteration of an underlying process being monitored. For instance, this may refer to a delivery of harvested material from a field to a site. In embodiments, the queue cycle 204 includes, but is not limited to, the following properties: a start time indicated using a time zone-aware type; an end time indicated using a time zone-aware type; a subject identifier indicating which piece of equipment performed an action; one or more event blocks 202 displayed in a sequence based on the order they take place; and a correlation score representative of a how well a particular queue cycle 204 represents the underlying process.

In embodiments, the correlation score provides a numerical value in which a low number is indicative of poor representation and a high number indicates that the sequence of event blocks 202 of the queue cycle 204 significantly resembles the modeled process. For example, a threshold value may be determined for a particular queue cycle 204 such that queue cycles 204 with a quality score below the threshold value are rejected, and queue cycles 204 with a quality score above the threshold value are preserved.

In the context of the present disclosure, a "group" may refer to a set of queue cycles 204 that share certain properties but also exhibit differences and cannot simultaneously be true. For example, a group serves as a plausible starting point before considering additional evidence artifacts 105. One common challenge in modeling deliveries from multiple potential locations is the difficulty in pinpointing the exact point of origin. In the context of load deliveries, all plausible queue cycles 204 with the same destination but different origins can be grouped together. Within each group, only one point of origin is valid. By incorporating evidence artifacts and selecting the most suitable queue cycle 204 for each group, the system may implicitly resolve the point of origin.

In embodiments, the system 100 generates a matching score representative of the similarity between the modelled data of a queue cycle 204 and recorded evidence artifacts 105 (e.g., information on a scale ticket, data from external integrator, or the like). For example, the matching score may include a value between zero and one such that zero indicates a total mismatch and one indicates a perfect match.

The numerous advantages of the present disclosure may be better understood with reference to multiple examples. In this regard, the following examples are provided to assist those skilled in the art to better understand the numerous advantages of the present disclosure, and are not to be understood as limiting.

In a first example, the proximity-based analysis system 100 applies a method 400 for tracking the field completion of harvesting units.

Figure 4:
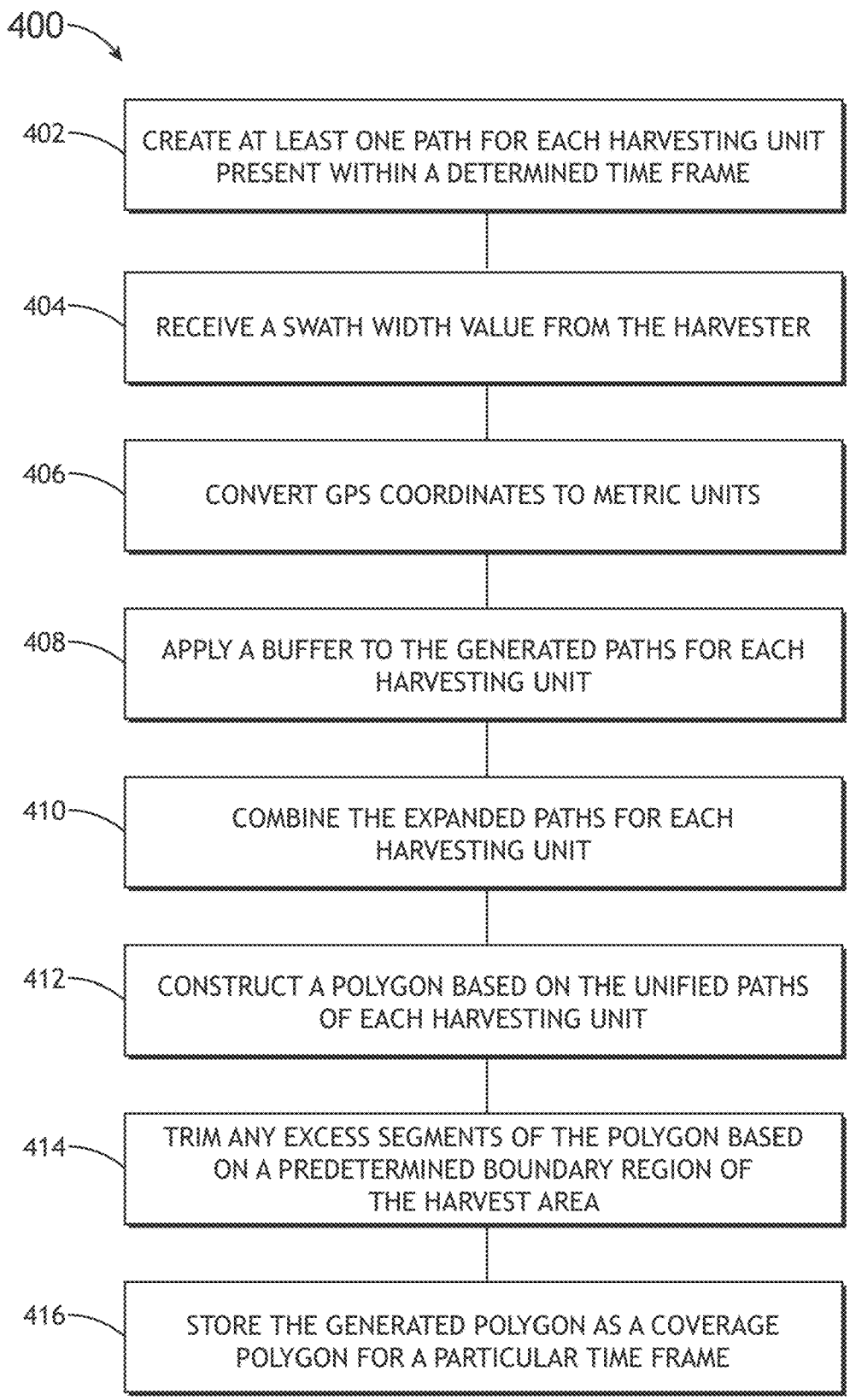
FIG. 4 illustrates a process flow diagram depicting a method for providing operational tracking insights of field completion, in accordance with one or more embodiments of the present disclosure.

FIG. 4 illustrates a process flow diagram depicting a method 400 for providing operational tracking insights of field completion, in accordance with one or more embodiments of the present disclosure. It is noted herein that the steps of method 400 may be implemented all or in part by the system 100 illustrated in FIG. 1A. It is further recognized, however, that the method 400 is not limited to the system 100 illustrated in FIG. 1A in that additional or alternative system-level embodiments may carry out all or part of the steps of method 400.

In a step 402, at least one path is created for each harvesting unit present within a determined time frame. For example, the system 100 creates continuous paths by connecting the consecutive GPS data points for each harvesting unit operating in the field within a specified time frame.

In a step 404, a swath width value is received. For example, the system 100 may receive the swath width from metadata associated with the harvesting equipment. By way of another example, the swath width may represent the coverage area of the harvester during each pass.

In a step 406, GPS coordinates are converted to metric units. For example, the system 100 may use a suitable coordinate reference system (CRS) to convert the GPS coordinates to metric units, which helps to standardize the spatial data and create a consistent metric grid.

In a step 408, a buffer is applied to expand the path of each harvesting unit. For example, the system 100 may determine the buffer based on the swath width, which will help to simulate the coverage area of the harvesting equipment during its operation.

In a step 410, all expanded paths for each harvesting unit are combined. For example, the system 100 may use a spatial operation such as, but not limited to, unary union to combine the expanded paths into a unified representation.

In a step 412, a polygon is created representative of the harvested area based on the unified paths. For example, the system 100 may connect the endpoints of the paths obtained from joining consecutive GPS data points for each harvesting unit, thus, forming a closed polygonal shape that embodies the entire traversed region. By way of another example, the system 100 may connect the paths sequentially to form the boundary around the harvested area, defining the polygon shape.

In embodiments, the constructed polygon undergoes a simplification process involving the reduction of vertices in the polygon while retaining its essential shape. Notably, this will streamline the representation of the polygon, making it more manageable without sacrificing the critical details.

In a step 414, the generated polygon is trimmed to fit within the specified boundary region. For example, the system 100 may confine the generated polygon to the specified boundary region, thus, any segments that extend beyond the predefined bounds are removed.

In a step 416, the generated polygon is stored as a coverage polygon for a particular time frame. For example, the system 100 may record the resultant polygon, which represents the coverage of harvesting units during the specified time frame. Notably, this recorded information may help to provide insights into the completion of activities in the field by the harvesting units during the designated period.

It is noted herein the method 400 is not limited to the steps and/or sub-steps provided. The method 400 may include more or fewer steps and/or sub-steps. The method 400 may perform the steps and/or sub-steps simultaneously. The method 400 may perform the steps and/or sub-steps sequentially, including in the order provided or an order other than provided. Therefore, the above description should not be interpreted as a limitation on the scope of the present disclosure but merely an illustration.

In a second example, the system 100 is configured to identify a site visit for a vehicle based on identified event blocks 202.

Figure 5A:
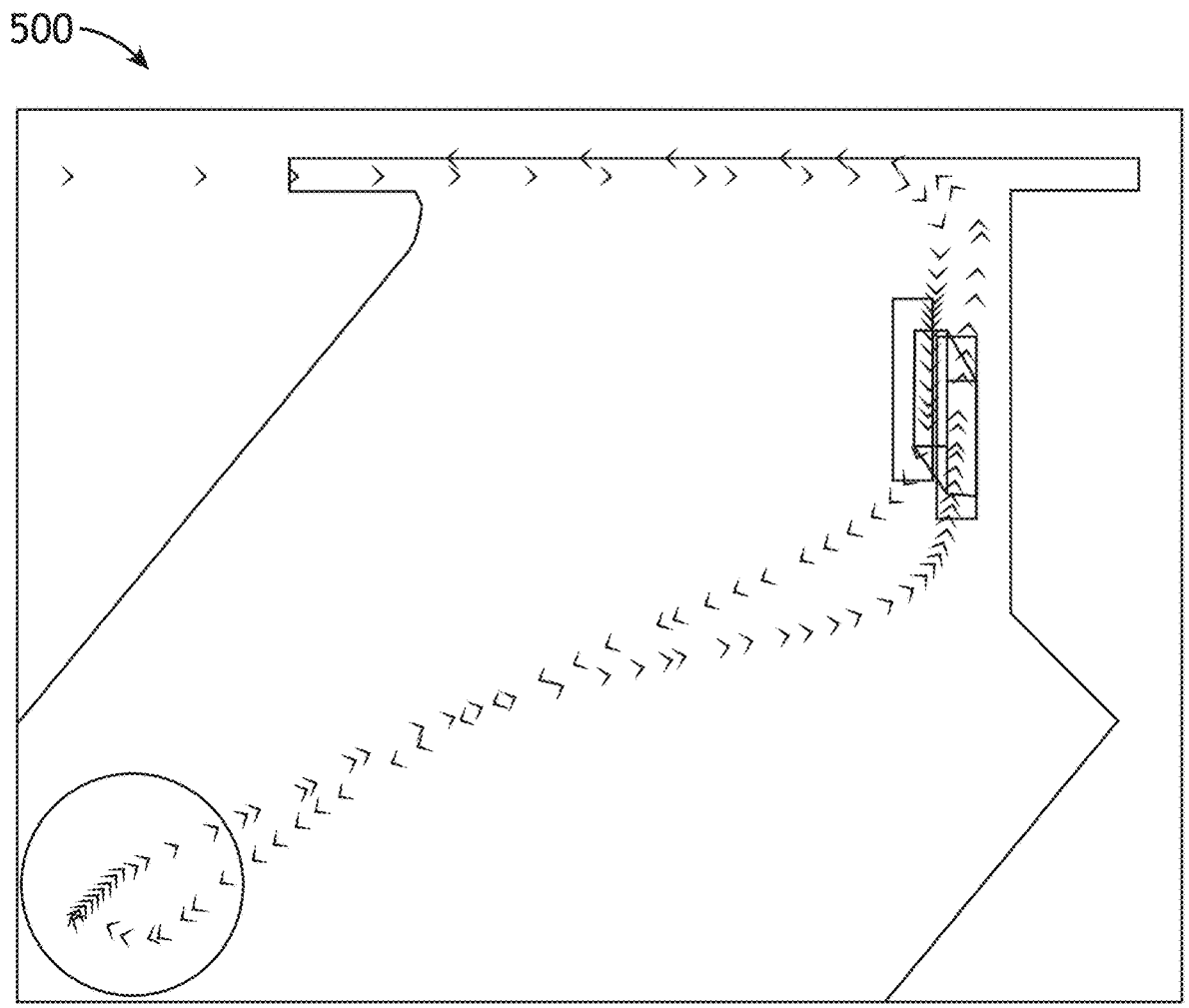
FIG. 5A illustrates a system for operational tracking of an entity including an associated queue cycle, in accordance with one or more embodiments of the present disclosure.
Figure 5A:
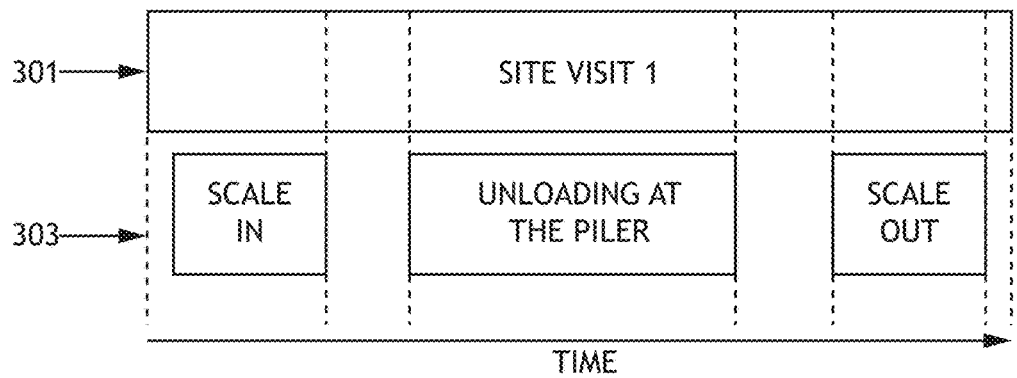

FIG. 5A illustrates a system for operational tracking of an entity including an associated queue cycle 204, in accordance with one or more embodiments of the present disclosure. In embodiments, the system 100 identifies the site visit based on the one or more event blocks 202 generated when on the site. For example, system 100 may identify a parent event block 301 for the site visit. The starting point and stopping point of the parent event block 301 may define the time window in which detection of children event blocks 303 may occur. For instance, children event blocks 303 falling within the time window, established by the parent event block 301, may include, but are not limited to, a vehicle scaling in (e.g., entering with a full commodity load), unloading at the piler, and a vehicle scaling out (e.g., emptying commodity load).

Figure 5B:
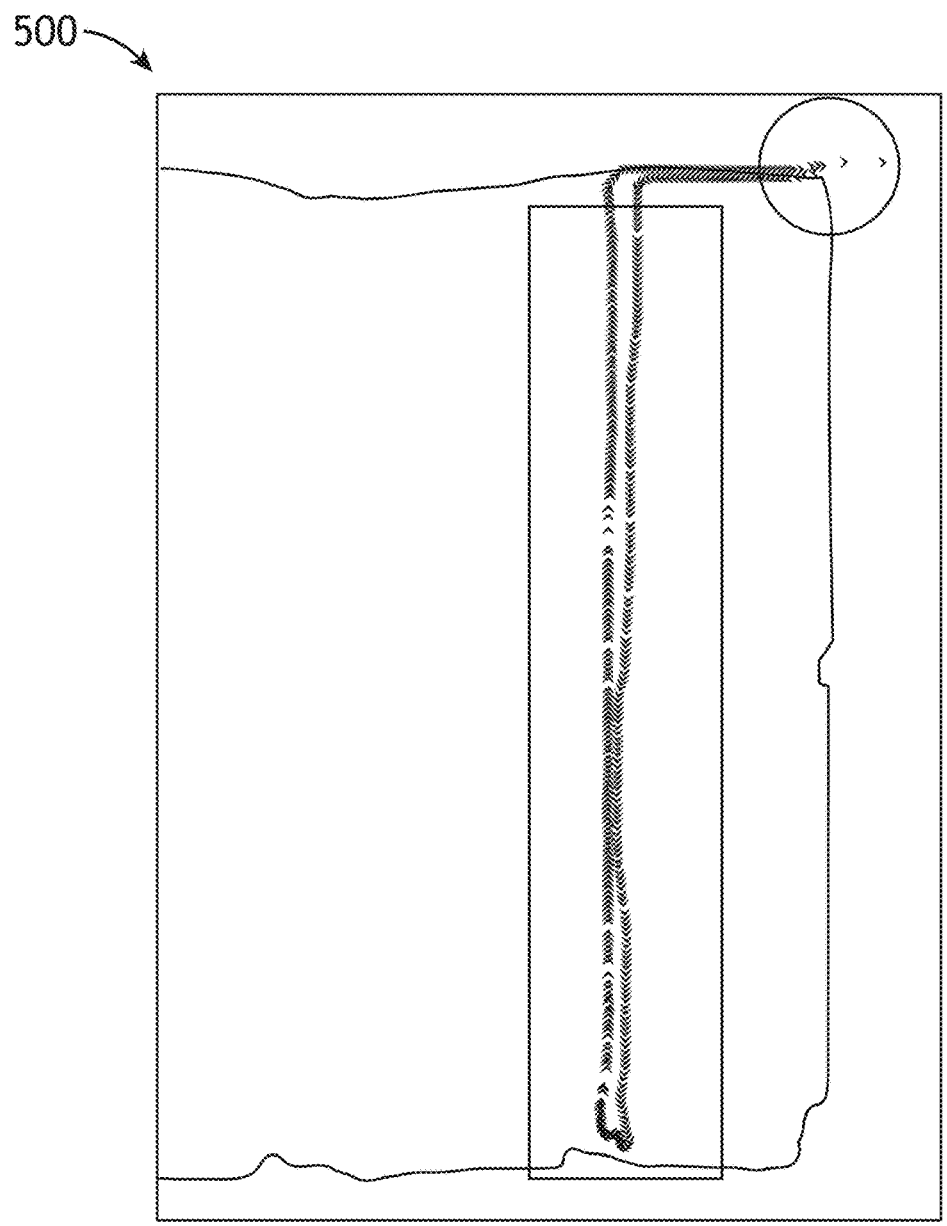
FIG. 5B illustrates a system for operational tracking of a vehicle including an associated queue cycle, in accordance with one or more embodiments of the present disclosure.
Figure 5B:
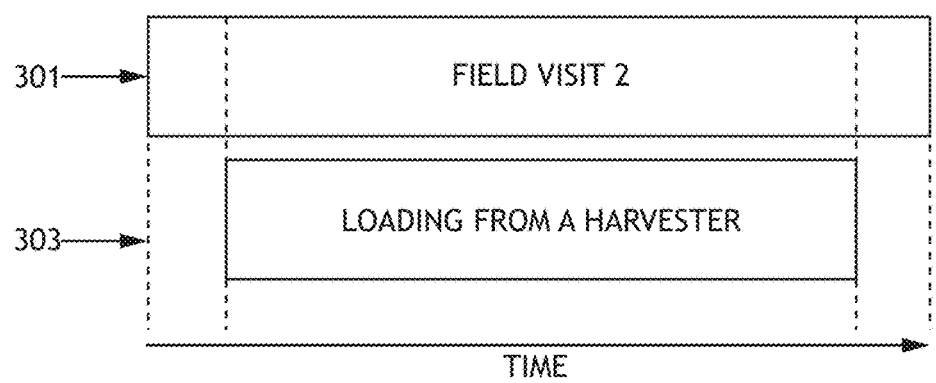

FIG. 5B illustrates a system for operational tracking of an entity including an associated queue cycle 204, in accordance with one or more embodiments of the present disclosure. In embodiments, the system 100 identifies the site visit based on one or more of the event blocks 202 generated when the vehicle is in the field. For example, a parent event block 301 may be defined by entry and exit points of the field, and the child event block 303 may be defined by the initial point and end point associated with loading from a harvester. By identifying and logging these site visits, valuable insights into the operational activities are made, enhancing overall visibility and management of field-related operations.

Notably, one or more visualizations 500 are provided to illustrate a potential path that an entity may take throughout an operation. The path taken by the entity may correspond to the parent event block 301 and children event blocks 303 associated with a given operation. It is noted herein that visualization 500 is provided merely for illustration purposes and is not intended to limit the scope of the present disclosure.

In a third example, the system 100 is configured for automatic contract to load assignment (CLA).

In embodiments, system 100 automatically determines CLA based on one or more generated queue cycles 204. It is noted herein that the one or more queue cycles 204 may represent a plausible sequence of events to identify a contract associated with a particular field. It is further noted that the contracts may be linked to specific geographic areas (fields) through the use of geofences. It is further noted that the contracts may be linked to a quantity of a commodity. For example, the quantity of the commodity may be measured in bushels.

In embodiments, the system 100 is configured to define a constrained mixed-integer linear minimization problem given sets of n evidence artifacts 105 "E" (e.g., scale tickets or the like) and m queue cycles 204 "Q" (e.g., sensor-data-based models of sequences of events, or the like), a group labeling function G(q) and a scoring function $s(e_i, q_j)$. For example, the constrained mixed-integer linear minimization problem may include the following constraints:

$$\min(x) c^T x$$
$$A_{ub} x \le b_{ub},$$
$$A_{eq} x = b_{eq},$$
$$l \le x \le u,$$

It is noted herein that $A_{ub}$ and bub are a matrix and a vector formulated such that at most one queue cycle 204 from each group can be a match to a particular element in the set of evidence artifacts 105. It is further noted that $A_{eg}$ and $b_{eg}$ are formulated such that each evidence artifact 105 of $e_i$ in the set of evidence 105 has exactly one solution. For example, null solutions may be created in case of n>m.

In embodiments, a cost vector c is generated to represent the penalty associated to match the set of evidence 105 $e_i$ with queue cycle 204 $q_j$ as follows:

$$c = 1 - \begin{bmatrix} s(E_0, Q_0) \\ s(E_0, Q_1) \\ \vdots \\ s(E_1, Q_0) \\ s(E_1, Q_1) \\ \vdots \\ s(E_{n-1}, Q_0) \\ s(E_{n-1}, Q_1) \\ \vdots \\ s(E_{n-1}, Q_{m-1}) \\ s(E_{n-1}, Q_{m-1}) \end{bmatrix}$$

Figure 6A:
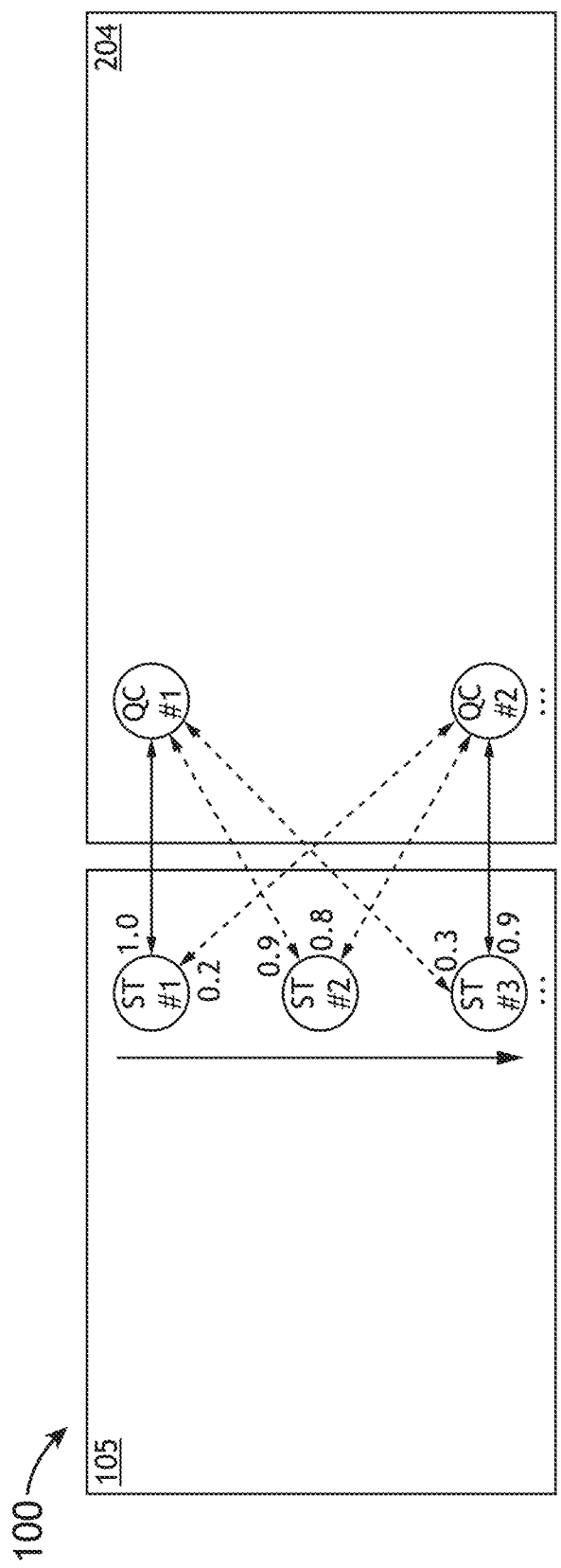
FIG. 6A illustrates a system for determining one or more representative queue cycles, in accordance with one or more embodiments of the present disclosure.

It is noted herein that the above cost vector captures all considered associations. It is further noted, in this approach, that data inaccuracies can be solved by fine-tuning the scoring function without the need for redesigning the entirety of the system. It is further noted, in this approach, that in the presence of uncertain data the system will still apply the above formulas to obtain a tentative solution FIG. 6A illustrates a system 100 for determining a matching score for all CLA candidates, in accordance with one or more embodiments of the present disclosure. In embodiments, the automated CLA operates by establishing a robust data association solution within a bipartite graph. For example, the bipartite graph may include at least a first node which represents a scale ticket and a second node which represents a queue cycle 204, with edges (e.g., weights) signifying a matching score between the two nodes. As mentioned above, a crucial constraint dictates that a single scale ticket may be matched with, at most, one queue cycle 204.

It is noted herein that the system 100 is not limited to scale tickets. However, the system 100 may extend to any evidence artifact 105 received from another form of digital input (e.g., imagery data, or the like), which can reliably provide timestamps and, optionally, target or vehicle identification.

In embodiments, the CLAs include a pairing of a customer record of receipt (e.g., a scale ticket, or the like) and a plausible queue cycle 204 which is determined based on similar timeframes and equipment identity.

In embodiments, GPS location data, within predefined geospatial boundaries, is used to determine the origin of the load, incorporating device location, proximity, geospatial boundaries, and equipment activity. Further, metadata provided by customers, including contract details, field names, and managing entities help to provide context to the load.

In embodiments, the system 100 generates CLA candidates by collecting any records of receipt as proof of load, and any queue cycles 204 and event blocks 202 that could match similar timeframes. In response to the generation of CLA candidates, the system 100 determines a matching score for all the candidates based on their compatibility. The highest-scoring CLA candidate is then determined, which must exceed a quality score threshold, and is recorded by the system 100 for later reference.

Figure 6B:
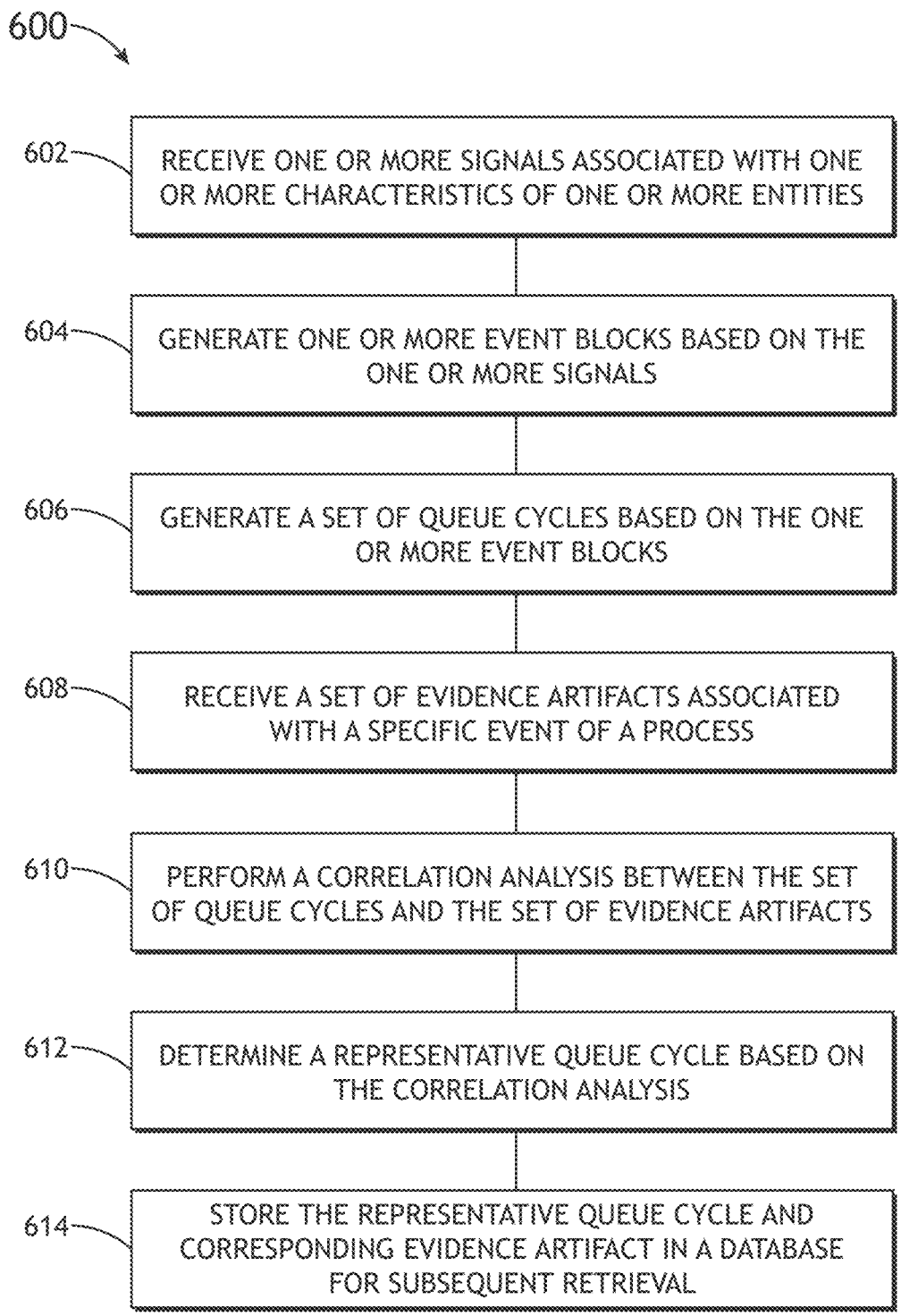
FIG. 6B illustrates a process flow diagram depicting a method for determining one or more representative queue cycles, in accordance with one or more embodiments of the present disclosure.

FIG. 6B illustrates a process flow diagram depicting a method 600 for providing operational tracking insights, in accordance with one or more embodiments of the present disclosure. It is noted herein that the steps of method 600 may be implemented all or in part by the system 100 illustrated in FIG. 1A. It is further recognized, however, that the method 600 is not limited to the system 100 illustrated in FIG. 1A in that additional or alternative system-level embodiments may carry out all or part of the steps of method 600.

In a step 602, one or more signals associated with a time-stamp and one or more characteristics of one or more entities are received from one or more sensors 102. In embodiments, the one or more processors 108 are configured to cause the server 106 to receive the one or more signals.

In a step 604, one or more event blocks 202 are generated based on the received one or more signals. In embodiments, the one or more processors 108 are configured to generate the one or more event blocks 202. For example, each of the one or more event blocks 202 may include distinct beginning and end events. By way of another example, each event block 202 may include a set of features (e.g., metadata) describing what, when, and how an event took place.

In a step 606, a set of queue cycles 204 are generated based on the one or more event blocks 202. In embodiments, the one or more processors 108 are configured to generate the set of queue cycles 204. For example, each queue cycle 204 of the set of queue cycles 204 comprises at least a starting event block candidate 302 and an ending event block candidate 304. In embodiments, some of the set of queue cycles 204 includes one or more intermediate event blocks 308 occurring between the starting event block 302 candidate and the ending event block candidate 304.

In a step 608, a set of evidence artifacts 105 associated with an occurrence of a specific event of a particular process is received. In embodiments, the one or more processors 108 are configured to cause the server 106 to receive the set of evidence artifacts 105.

In a step 610, a correlation analysis is performed between the set of queue cycles 204 and the set of evidence artifacts 105. In embodiments, the one or more processors 108 are configured to perform the correlation analysis. For example, the one or more processors 108 may compare each artifact 105 of the set of evidence artifacts 105 to each queue cycle 204 of the set of queue cycles 204 and assign a correlation score for each evidence artifact-queue cycle pair.

In a step 612, a representative queue cycle 204 is determined. In embodiments, the one or more processors 108 may determine the representative queue cycle 204 by identifying the queue cycle 204 with the highest correlation score.

In a step 614, the representative queue cycle 204 and corresponding evidence artifact 105 are stored in a database for subsequent retrieval. In embodiments, the one or more processors are configured to store the representative queue cycle 204 and corresponding evidence artifact 105 in the database.

In embodiments, the one or more processors are further configured to train a machine learning model based on a plurality of stored representative queue cycles and corresponding evidence.

It is noted herein the method 600 is not limited to the steps and/or sub-steps provided. The method 600 may include more or fewer steps and/or sub-steps. The method 600 may perform the steps and/or sub-steps simultaneously. The method 600 may perform the steps and/or sub-steps sequentially, including in the order provided or an order other than provided. Therefore, the above description should not be interpreted as a limitation on the scope of the present disclosure but merely an illustration.

In a fourth example, the system 100 may be configured to track a set of evidence 105 associated with a chain of custody.

In embodiments, the system 100 can access evidence artifacts 105 from CLA records detailing the chronological sequence of events involving the custody, control, transfer, analysis, and disposition of materials, including both physical and electronic evidence artifacts 105. For example, the system 100 may use geospatial boundaries and metadata, equipment metadata, entity metadata, and ground proofing imagery coupled with optical character recognition (OCR) to associate these events. By way of another example, these events may be validated through use of a tool which can view the above data and generated CLA records to allow a user to visually prove, acknowledge, and annotate the events.

In a fifth example, the system 100 may be configured to track the set of evidence artifacts 105 associated with a valued chain.

In embodiments, CLA records includes proof or documentation of the sequential activities and processes that a party engaged in a specific industry undertakes to create and deliver a valuable product to the end customer. For example, system 100 may receive a set of evidence artifacts 105 through the CLA which provides a clear record of how each party within the industry contributes to the value chain, from the initial stages of production or acquisition of raw materials to the final delivery of the product to the customer. By way of another example, this set of evidence artifacts 105 may help in understanding and documenting the various steps and stages involved in creating value for the end customer within a specific industry.

In a sixth example, the system 100 may be configured to track the transportation quality of a particular load.

In the given context, transportation quality may refer to a score used to assess and evaluate the quality of transportation services for a given load. For example, the scoring may be based on specific criteria, such as delays in transporting a load to its processing location and the consideration of environmental conditions during transportation. In embodiments, system 100 assesses whether there were delays in transporting a load to its designated processing location. For instance, delays may impact the overall efficiency of the transportation and may have downstream effects on other operations within the supply chain. In embodiments, the system 100 assesses whether there are temperature-sensitive goods present, ensuring that the transportation process adheres to specified conditions to prevent harm to valuable products or commodities. Notably, the value of the score helps to measure and quantify aspects related to the efficiency, safety, and overall quality of the transportation process, which can then be automatically determined, reported, and/or alerted on if needed.

In a seventh example, the system 100 may be configured to track the estimated yield and progress of a contract.

In embodiments, system 100 determines an estimated yield and contract progress based on an analysis of scale tickets, CLAs, and devices operating within a defined geospatial boundary with expected equipment activity. For example, a correlation may be automatically determined between weighed loads and the truckloads that originated from harvesters in the field. This correlation may reassure that the weight data from the scale tickets is accurately linked to the specific truckloads associated with harvesters operating in the field.

In an eighth example, the system 100 may be configured to track equipment usage utilization.

In embodiments, system 100 utilizes key vehicle-level properties, including speed, acceleration, and vibration level to track equipment usage utilization. Further, the system 100 may categorize equipment utilization into distinct states, such as "off," "idle," and "active" based on the key vehicle-level properties. It is noted herein that categorization allows for comprehensive usage reporting, providing insights into how efficiently various pieces of equipment are utilized in operational settings.

In embodiments, the data derived from the key vehicle-level properties are valuable to understanding the operational status of equipment. For example, by differentiating between periods of activity, idleness, and being turned off, the system can generate usage reports that quantify the time and efficiency of equipment utilization.

In embodiments, the data provides an extended use such as making informed operational decisions. For example, by understanding the efficiency of different pieces of equipment and related operations, organizations can streamline enterprise operations effectively. For instance, if certain equipment exhibits poor utilization, the data can guide decisions such as optimizing the use of existing equipment, delaying equipment purchases, or adjusting the size of the equipment fleet across the operation.

In a ninth example, the system 100 may be configured to track equipment activity.

In embodiments, system 100 is configured to analyze vehicle-level properties such as, but not limited to, speed acceleration, vibration level, or on-vehicle equipment (e.g., arms, pumps, motors, lifts, gates, tarps, and the like). For example, the data associated with the vehicle-level properties may be analyzed and recorded for specific functional activity. By way of another example, data such as, but not limited to, pump run-time may be automatically associated with a "fill" operation due to a proximity of a vehicle during the fill operation. Further, the system 100 may be configured to transfer the inventory automatically and virtually from one vehicle or container to automate the change of chain of custody.

In a tenth example, the system 100 may be configured to track CLA progress.

Figure 7:
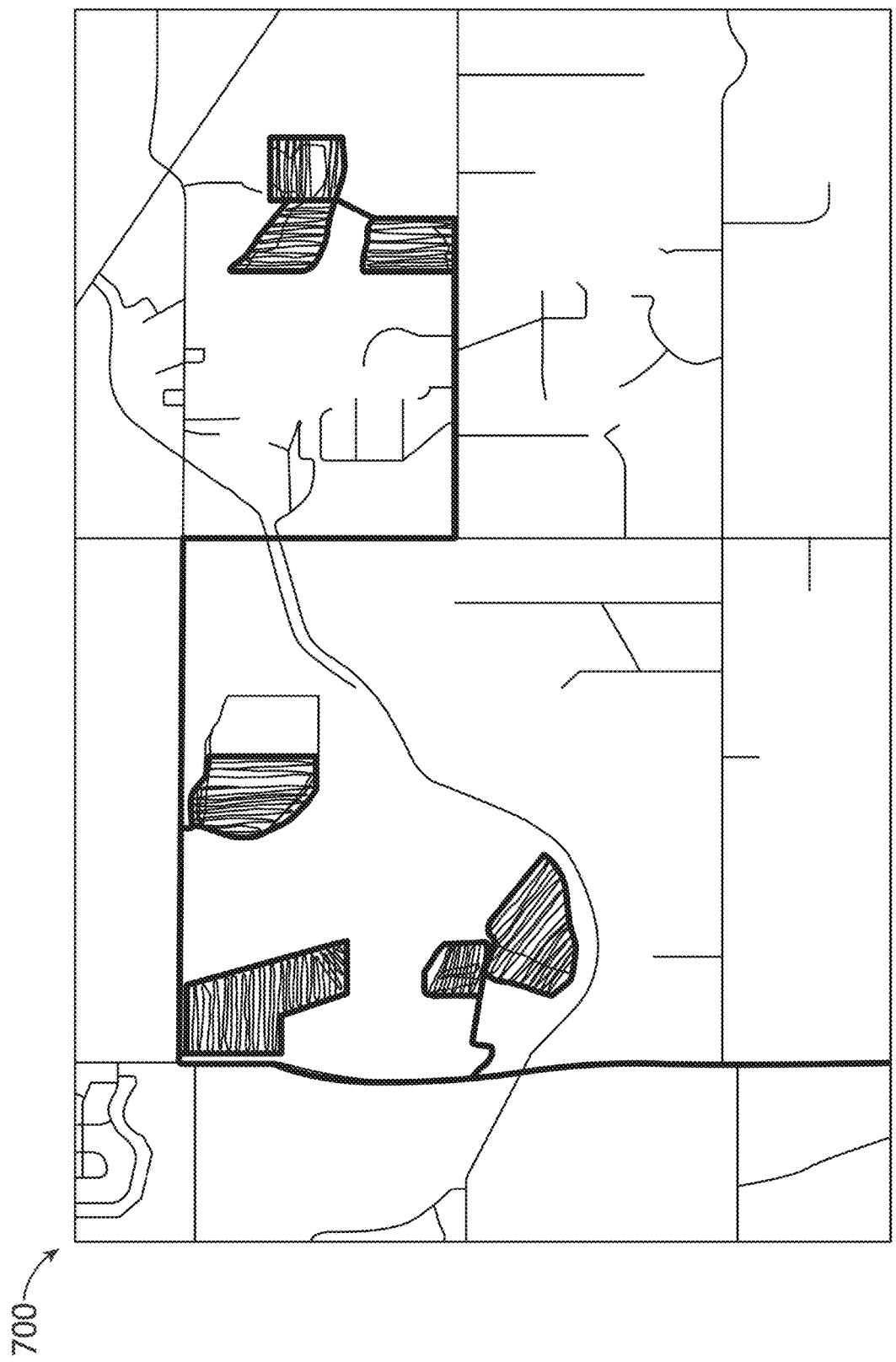
FIG. 7 illustrates a map depicting the contract completion progress for a geospatial area of interest, in accordance with one or more embodiments of the present disclosure.

FIG. 7 illustrates a map 700 depicting the contract completion progress for a geospatial area of interest, in accordance with one or more embodiments of the present disclosure. In embodiments, the system 100 is configured to track CLA progress by leveraging geospatial areas of interest and expected activity, providing an aggregate expression of completion for various operations (e.g., harvest), within a predetermined timeframe. For example, a progress metric may be derived by considering the geospatial boundaries and anticipated activities associated with the specific contractual tasks. This automated concept may extend to a wide range of operations such as, but not limited to, field work, crop harvesting, mowing, hay windrowing, bale picking, roofing, spraying, logging, fishing, fence installation, equipment deployment, seeding, planting, and the like.

In an eleventh example, the system 100 may be configured to track assets.

In embodiments, the system 100 is configured to track assets based on GPS data sourced from one or more devices coupled to equipment and/or other assets. For example, these devices may utilize GPS data to provide asset information such as, but not limited to, the location, speed, heading, and the quality of the data. By way of another example, the system 100 may aggregate the collected data to facilitate reporting functionalities that include path tracking, comparative analysis, whether historical or against Standard Operating Procedures (SOP), and the provision of evidence artifacts 105 pertaining to Chain of Custody or Value Chain between processes or parties.

In a twelfth example, the system 100 may be configured to estimate inventory based on proximity.

In embodiments, the system 100 is configured to determine a load state of a tank based on a location in the queue cycle 204. For example, a mobile tank queue cycle 204 may include the following events such as, but not limited to, "empty on site" (i.e., current load state=empty or "0"); "filling" (new load state=full or "1"); "scaling out"; "mobilized to the field"; "in-field—full"; "in-field—empty" (new load state=empty or "0"); "mobilized back from field"; "scale in"; and "empty—on site". It is noted herein that descriptions of load states coupled with a proximity (i.e., on-site—empty) help to increase inventory probability.

In embodiments, the system 100 may determine an inventory level for a site by utilizing the known full volume of the load to add or subtract available volumes of mobile vehicles. This can be combined with any fixed volume measurements at the site (e.g., bulk storage units that the mobile tanks are filled from). For example, Site A may have 2 large, fixed volume tanks with a volume of 30,000 gallons each that is used to fill all the mobile tanks on site. They have 100 mobile tanks, each with a volume of 1,000 gallons that are utilized by their customers to deliver and apply fertilizer. This means that the potential capacity of the system is 160,000 gallons, where two of the 30,000-gallon fixed tanks=60,000 gallons of potential fixed storage, and 100 of the 1,000 gallon tanks=100,000 gallons of potential mobile storage. This means that when all the fixed tanks on site are full and the mobile tanks are all empty, there will be 60,000 gallons of fertilizer in the system. As soon as mobile tanks are filled, the volume of the fixed tanks is reduced by the capacity of the mobile tank. Ten mobile tanks are filled and moved off-site which would mean that the new volume of the system is 60,000 gallons minus 10 mobile tanks multiplied by their volume expressed as: 60,000−(10*1000)=50,000 gallons of the new current volume for the site.

In a thirteenth example, the system 100 is configured to track the application of inputs via load proximity.

Figure 8:
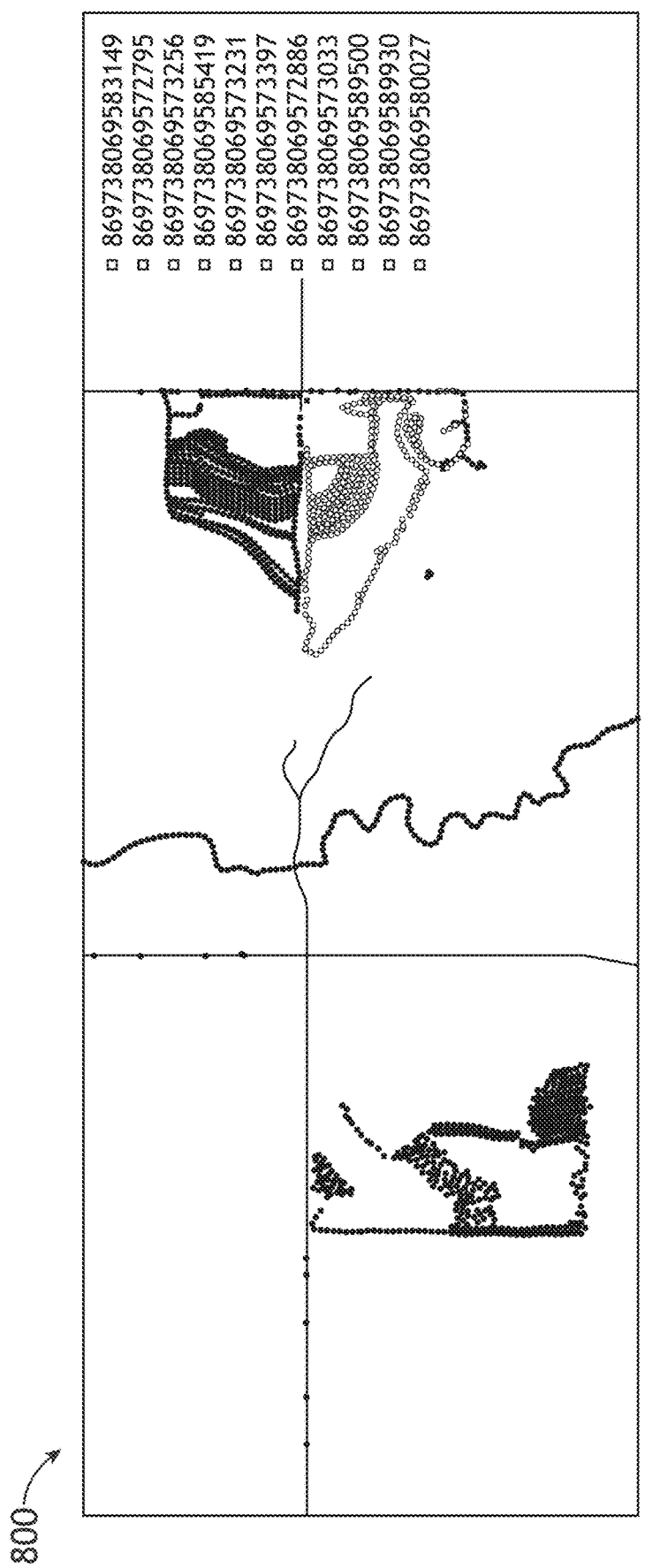
FIG. 8 illustrates a map depicting coverage of a geofence for a particular entity, in accordance with one or more embodiments of the present disclosure.

FIG. 8 illustrates a map 800 depicting coverage of a geofence for a particular entity, in accordance with one or more embodiments of the present disclosure. In embodiments, delivery locations inherit an application based on the proximity to the load point or site where the material to be applied was loaded. For example, vehicles or geofences may have a property which defines the material that they haul. For instance, site A may have two large, fixed volume tanks each with a volume of 30,000 gallons that are used to fill all the mobile tanks on site. Assuming 100 mobile tanks each with a volume of 1,000 gallons are utilized by their customers to deliver and apply fertilizer. Both the fixed volume tanks and the mobile tanks may be defined to hold a load of anhydrous ammonia fertilizer (NH3). Since the source location and the delivery location are known, a probability of confidence may be assigned that NH3 was either delivered or applied from that source to that delivery location. It can further be implied by observing the activity of the tank in the field whether a delivery or application was made. A mobile tank that moves back and forth across a geofence is likely a component of a fertilization application. Therefore, an application (NH3 fertilization) may be assigned and an estimated volume (4×1,000 gallon tanks)=4,000 gallons of NH3 applied to that geofence.

In a fourteenth example, the system 100 is configured to estimate an application rate of a vehicle.

Figure 9:
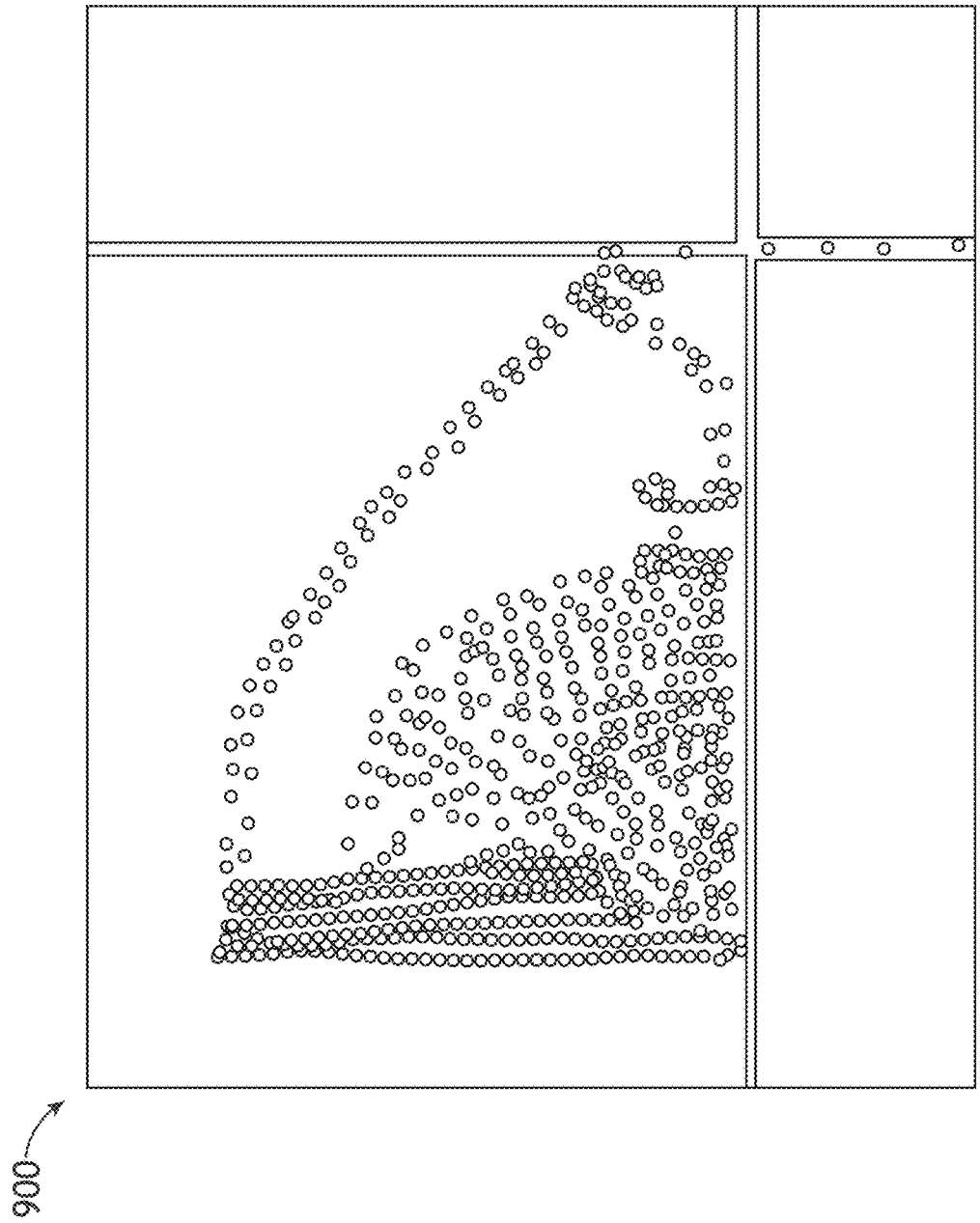
FIG. 9 illustrates a map depicting an application rate estimation of an entity, in accordance with one or more embodiments of the present disclosure.

FIG. 9 illustrates a map 900 an application rate estimation of an entity, in accordance with one or more embodiments of the present disclosure. In embodiments, the system 100 is configured to estimate application rates of vehicles based on the properties of the observed delivery. For example, the system may estimate the area of a particular vehicle covered and apply the volume of the material in the vehicle used to cover that area. By way of another example, one vehicle may cover multiple areas, or multiple tanks may cover one area.

For instance, ammonia has an analysis of 82-0-0, so if it is desired to apply 140 pounds per acre, then 171 pounds of ammonia (140 pounds divided by 0.82=171 pounds) will be needed.

In embodiments, fertilizer application rigs use a variable rate prescription which helps determine the amount utilized by area applied under each tank path. Therefore, an estimate of the weight of the anhydrous ammonia in the vehicle, an estimate of the area applied, and an assumption that is evenly applied in the area may allow for the estimation of the average number of pounds of ammonia applied per area.

In a fifteenth example, the system 100 may be configured to track geospatial load assignment and infer yield mapping.

In embodiments, the system 100 is configured to address challenges faced by commodity buyers by implementing geospatial load assignment and inferred yield mapping. For example, loads are tagged with corresponding geospatial data, indicating a specific field from which they were harvested. This ensures a precise assignment of each load to its originating location in the field. By way of another example, specific locations within the field may be designated as preferred sample locations. Further, in response to a load being received from these locations, they may be flagged for sampling or inspection. By way of another example, system 100 may identify a sample as low or high risk based on geospatial harvesting and delivery data.

Figure 10:
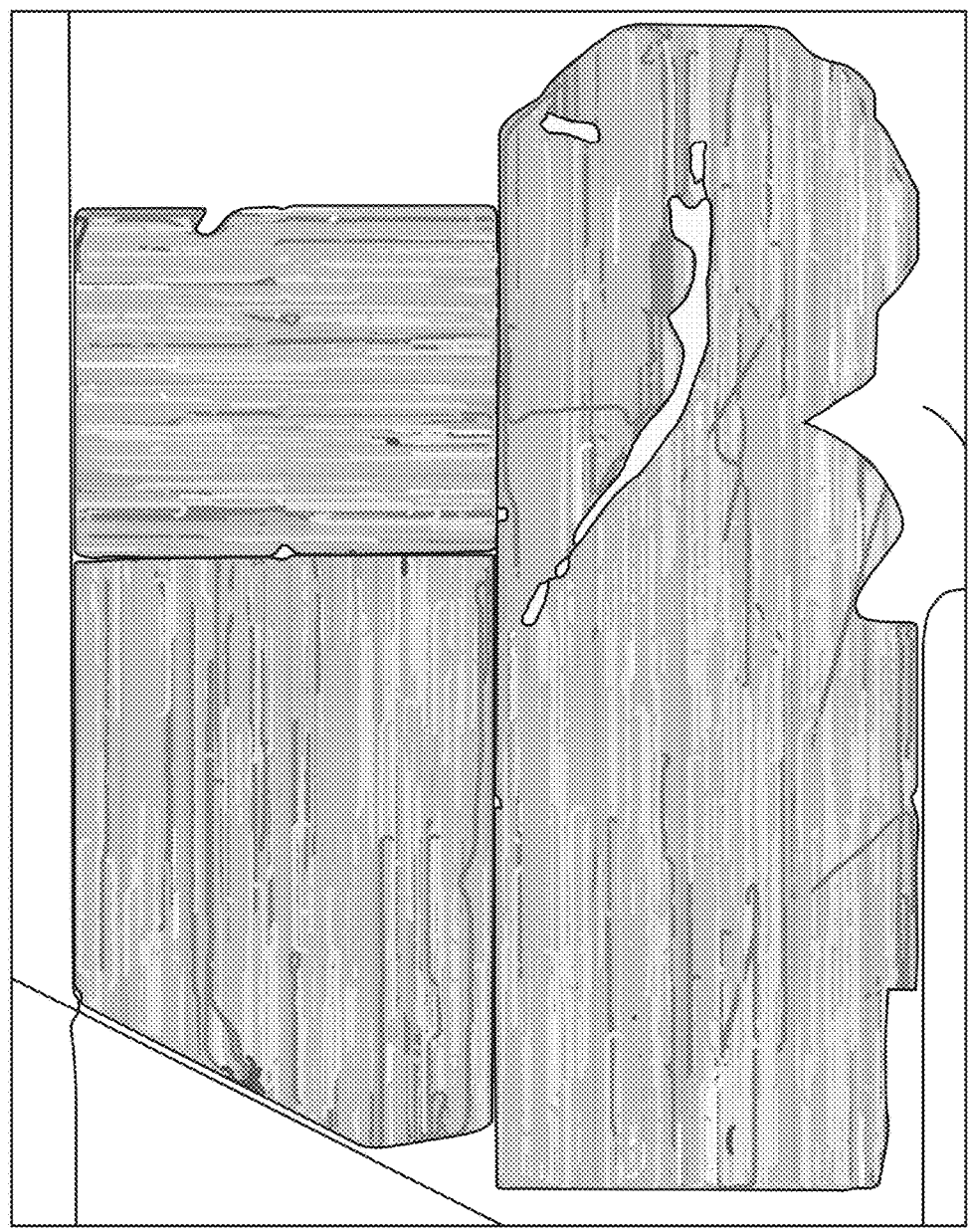
FIG. 10 illustrates a map providing a spatially distributed representation of a yield for a particular field, in accordance with one or more embodiments of the present disclosure.

FIG. 10 illustrates a map 1000 providing a spatially distributed representation of a yield for a particular field, in accordance with one or more embodiments of the present disclosure. In embodiments, the system 100 is configured to use geospatial load assignment data as the basis for creating the inferred yield map. For example, the weights received for each load may be applied to the corresponding harvested area.

In embodiments, the system 100 integrates a quality inspection optimization. For example, by leveraging geospatial load assignment and associated data, commodity buyers may optimize the quality inspection process. Loads from preferred sample locations may be prioritized for inspection, streamlining the assessment of critical areas and ensuring that representative samples are taken for accurate quality evaluation.

In embodiments, the system 100 is configured to prevent deceptive practices. For example, a deceptive practice may include, but is not limited to, a situation where portions of a bad load are strategically placed to appear as high-quality commodities. By way of another example, the system may detect anomalies and irregularities in the delivery pattern based on the geospatial load assignment, minimizing the risk of misleading representations.

In a sixteenth example, the system 100 may be configured to track conditions of a geospatial load assignment.

In embodiments, the system 100 is configured to integrate additional contextual information such as, but not limited to, time location, and corresponding environmental data. For example, the system 100 may track conditions of geospatial load assignment through the additional contextual information. By way of another example, the system 100 may integrate the geospatial load assignment with relevant environmental data, such as weather conditions (e.g., temperature, humidity, and the like). By way of another example, the system 100 may leverage timestamped load location data to correlate the movement of the load with specific points in time. By way of another example, the system 100 may utilize the integrated data to monitor conditions that may impact the animals, such as, but not limited to, stress due to high or cold temperatures. By way of another example, the system 100 may document protocols put in place to address specific conditions such as, but not limited to, providing cooling or water for animals during extended high temperatures. By way of another example, the system 100 may be configured to automate the enforcement of predefined protocols. For instance, if the system 100 detects conditions that trigger a required action, it could prompt notifications or automated responses to ensure compliance with established protocols.

FIGS. 11A-11G generally illustrate a scale house operation sub-system 1100 of system 100, in accordance with one or more embodiments of the present disclosure.

Figure 11A:
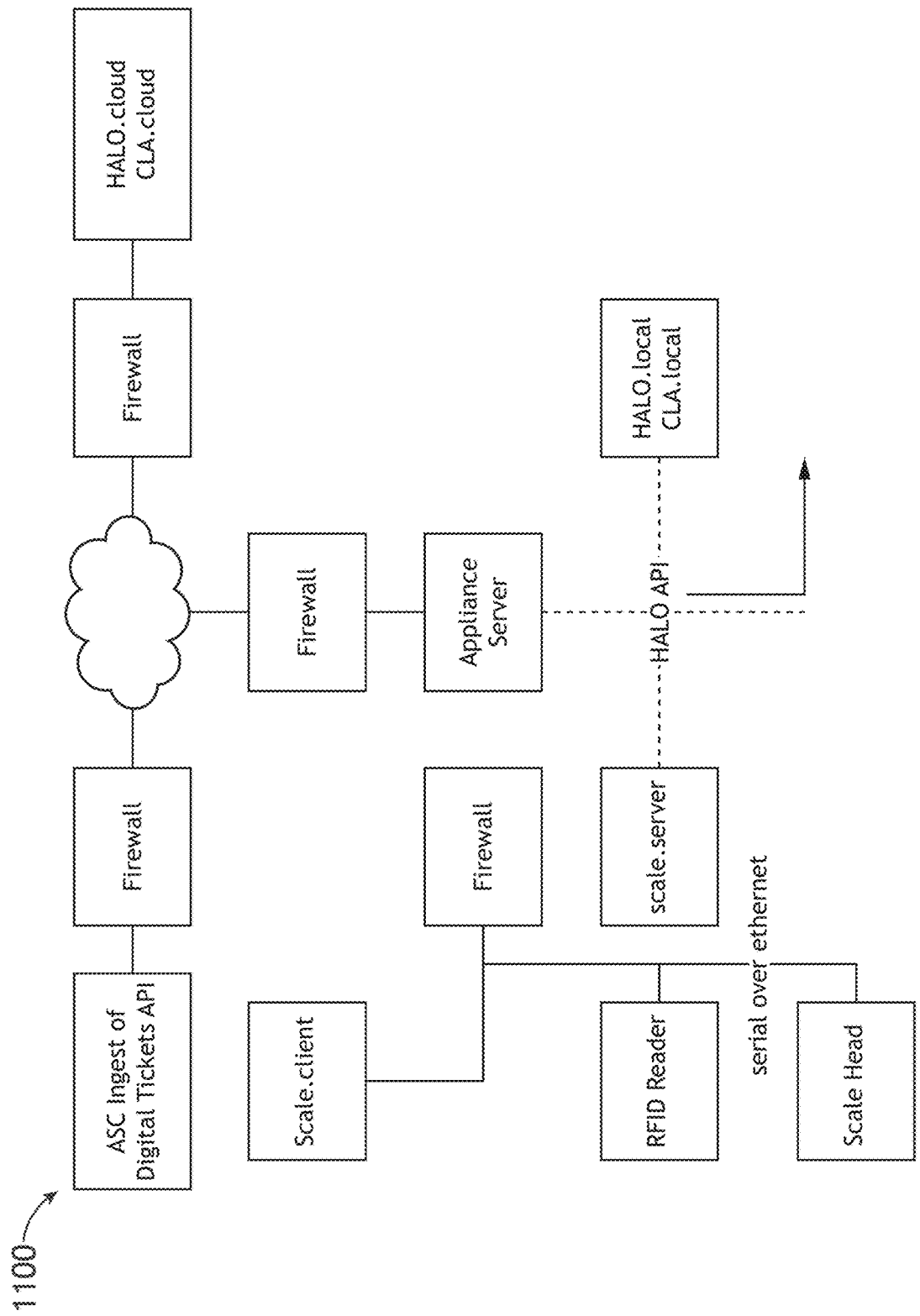
FIGS. 11A-11G generally illustrate a scale house operation subsystem of the system, in accordance with one or more embodiments of the present disclosure.

FIG. 11A illustrates a sub-system 1100 for providing automated scale ticketing, in accordance with one or more embodiments of the present disclosure. In embodiments, the sub-system 1100 includes at least one of a scale interface, one or more hardware components, one or more software components, a network, one or more firewalls, a ticketing API, and a database.

In embodiments, the scale interface is used to interact with the various weighing scales during load transactions. In embodiments, the one or more hardware components includes a high-speed automated load origination (HALO) appliance, which serves as a local hub for syncing and managing data associated with the scaling operations of the one or more entities and corresponding loads. In embodiments, the sub-system 1100 includes a local ticketing API and database. For example, the local ticketing API may serve as a gateway for external systems to retrieve and input data associated with the one or more loads. By way of another example, the database may ensure the storage and accessibility of the input and output data associated with the scale operations for subsequent analysis. In embodiments, one or more firewalls may be deployed within the local network infrastructure, ensuring that internal communication between different components of the scale house operation sub-system 1100 is secure. It is noted herein that physical equipment (e.g., hardware) may be deployed on, but is not limited to, an equipment rack.

Figure 11B:
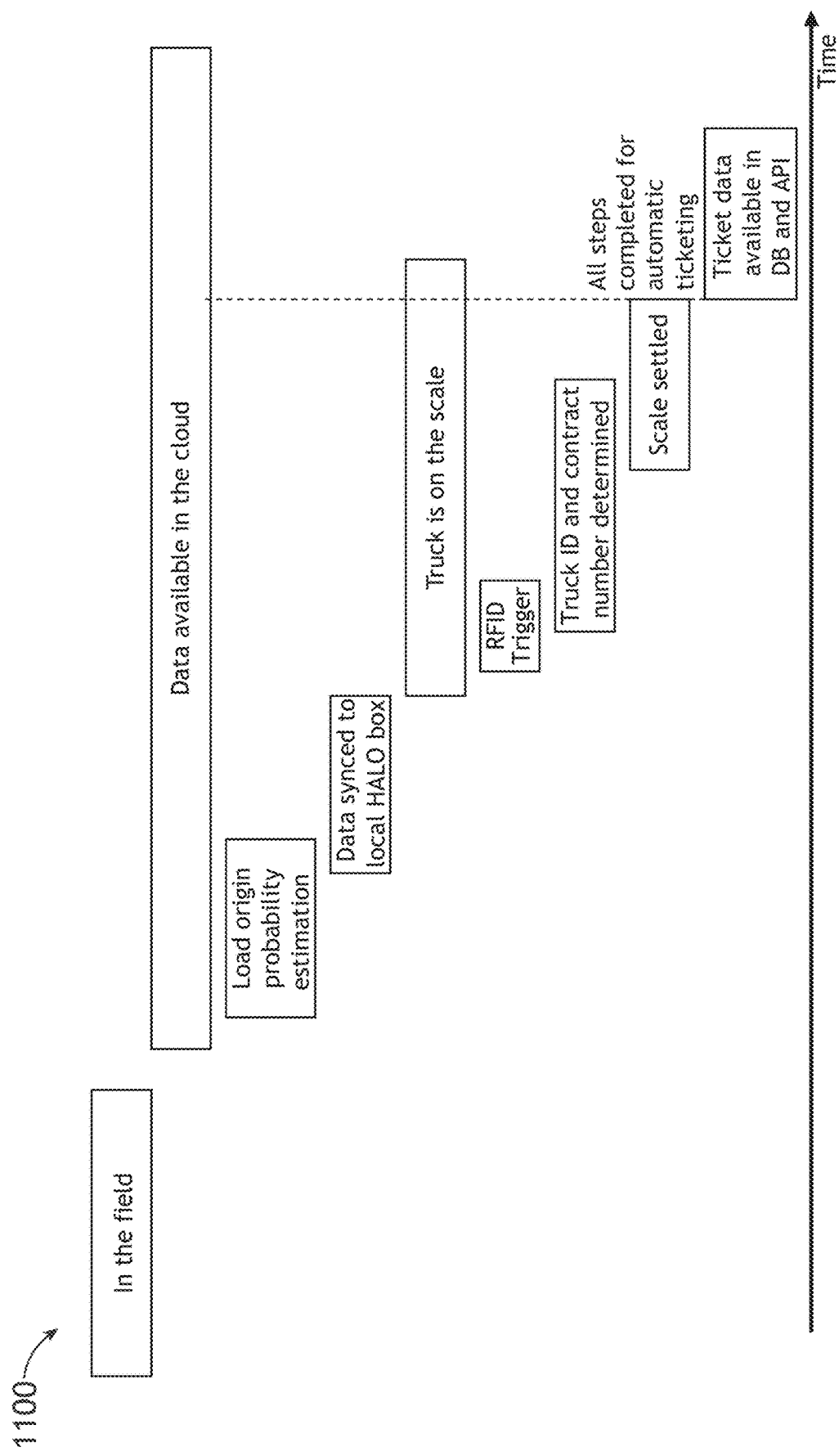
Figure 11C:
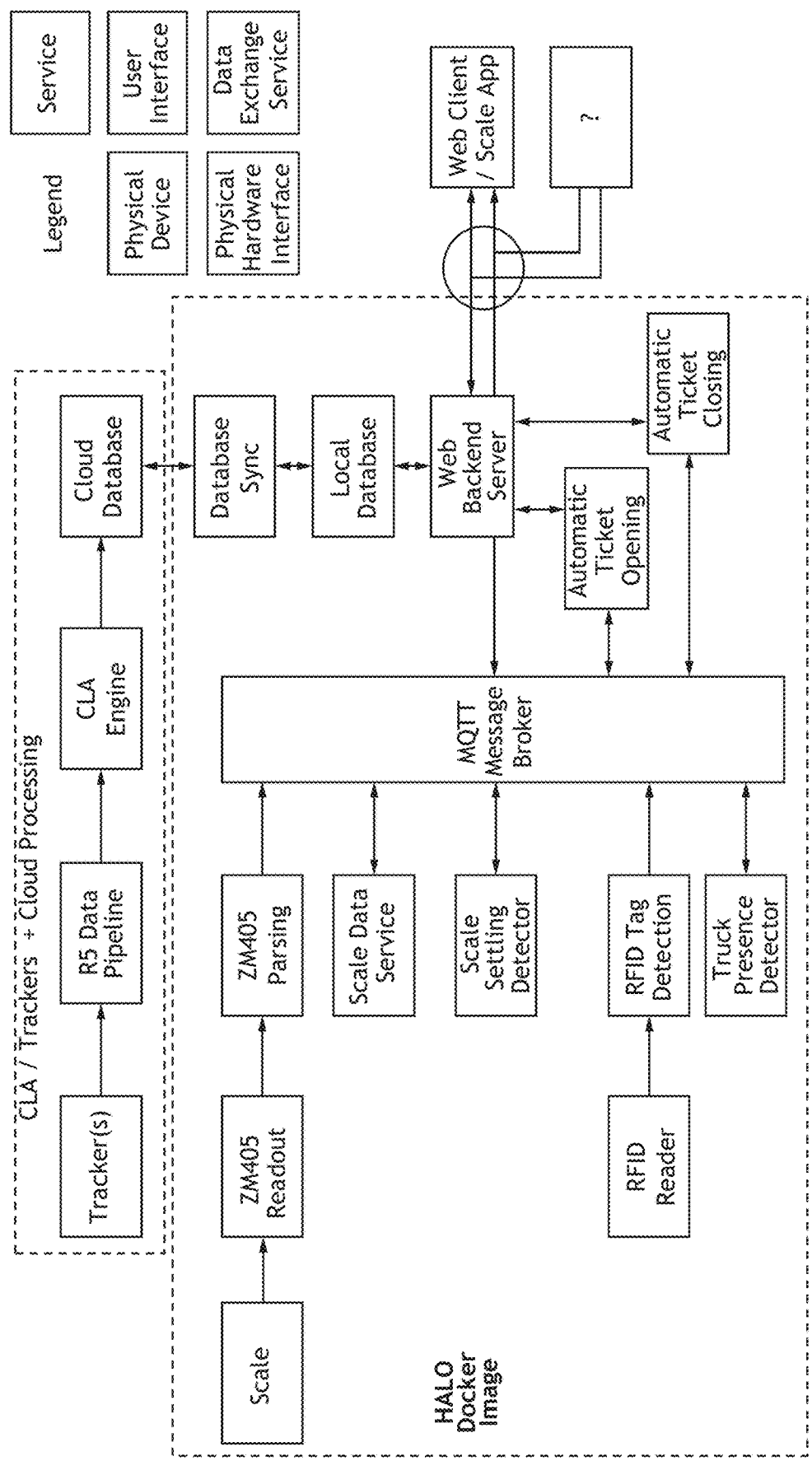
Figure 11D:
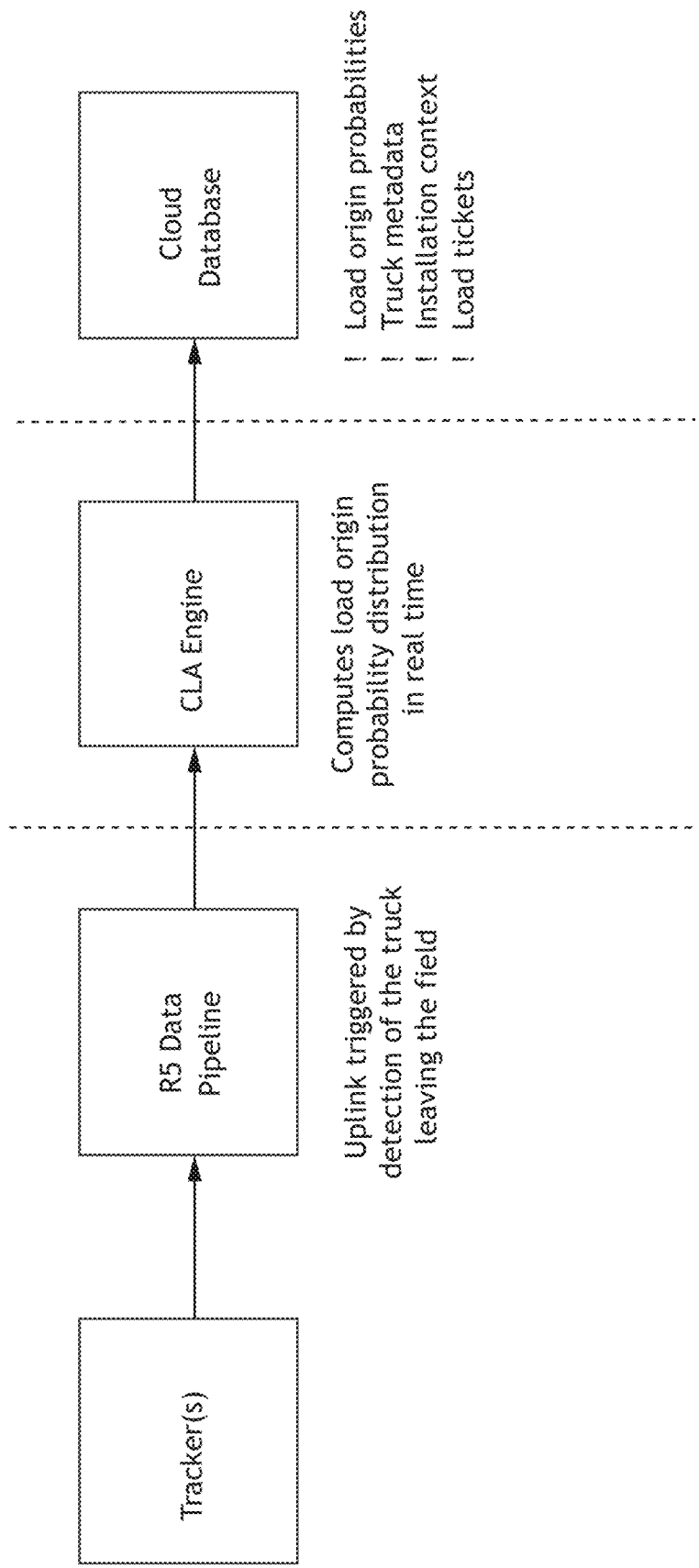
Figure 11E:
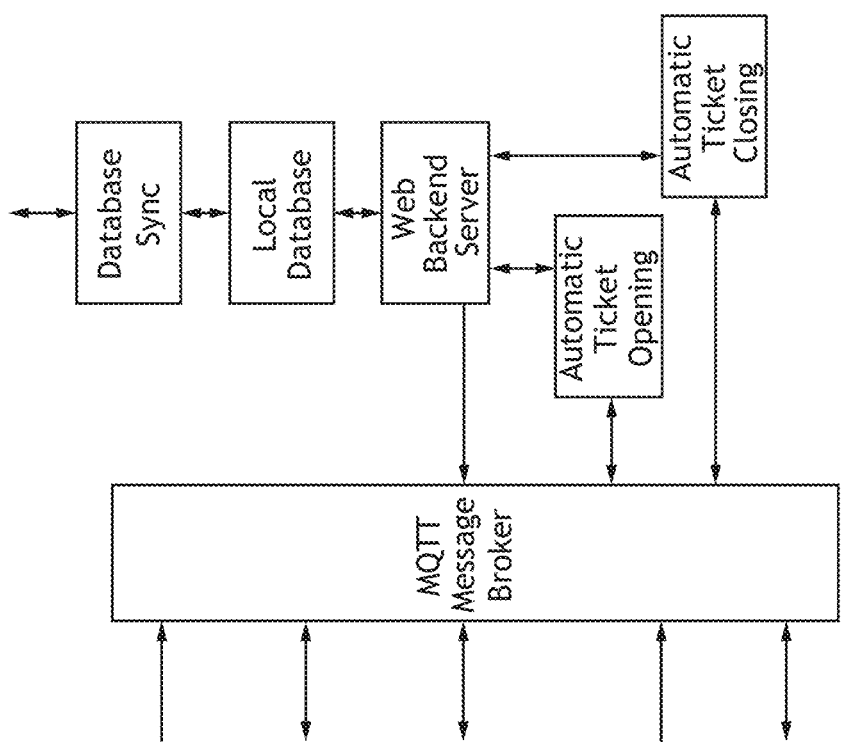
Figure 11F:
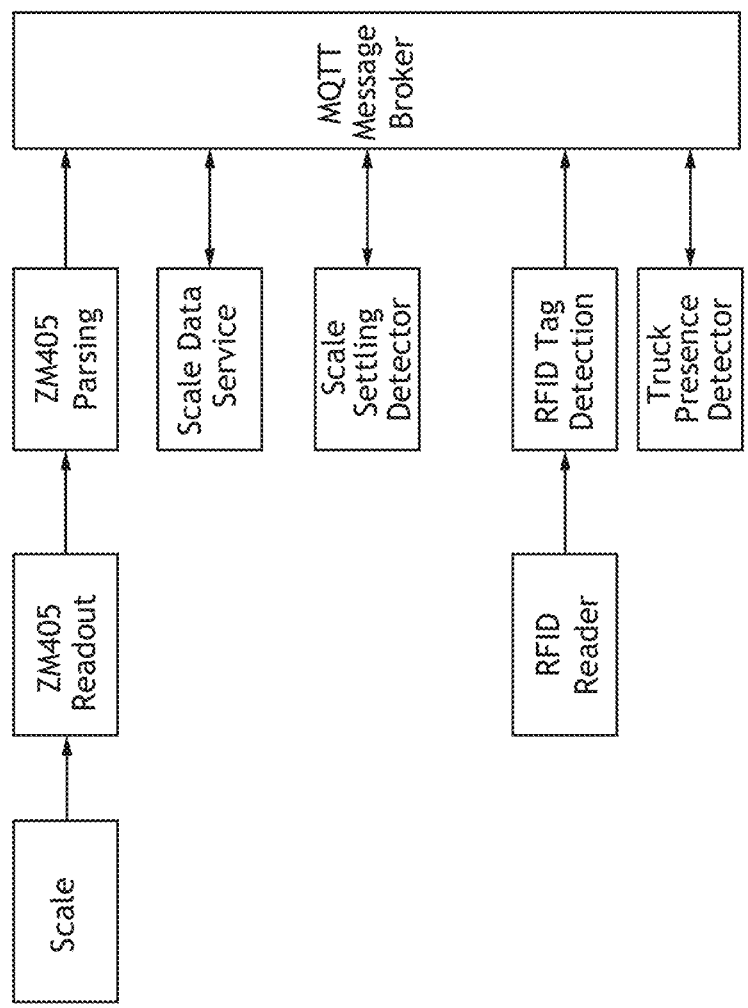
Figure 11G:
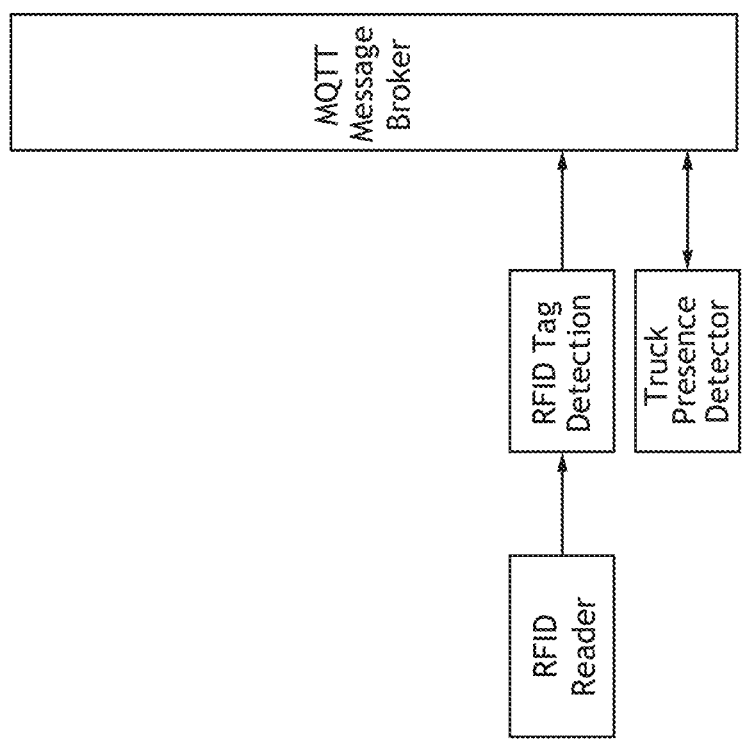

FIG. 11B illustrates a flow chart depicting an automated ticketing process 1101 of sub-system 1100, in accordance with one or more embodiments of the present disclosure.

In embodiments, one or more processors 114 are configured to cause the controller 112 to receive scale data associated with one or more loads and one or more corresponding entities. For example, the scale data may include a probability estimation of an origin of the one or more loads based on the received scale data. The load origin probability estimation may be determined based on, but not limited to, device location, proximity to other devices, geospatial boundaries, and equipment activity.

In embodiments, the scale data is transmitted, via the one or more processors 108, to the local controller 112. For example, the local controller 112 may store the scale data for reference at a later time. By way of another example, the local controller 112 may be communicatively coupled with the HALO appliance.

In embodiments, the one or more processors 114 of the local controller 112 may receive one or more signals from the one or more sensors 102 indicating that an entity is on the scale. For example, the one or more signals may include an RFID signal indicating the presence of an entity on a scale. In embodiments, the one or more processors are configured to determine an entity identification or a contract number based on the RFID signal. It is noted herein that the examples given are not to be regarded as limiting. In this regard, the one or more sensors 102 may include any transmitter (e.g., active transmitter, passive transmitter), receiver, transceiver, RFID tag, or RFID reader known in the art. In embodiments, the one or more processors 114 are configured to determine when a scale is settled (e.g., stabilized weight on scale).

In embodiments, the one or more processors 114 are configured to output ticket data associated with the one or more loads and one or more corresponding entities based on the one or more signals indicating the presence of an entity on the scale.

FIG. 11C-G illustrate a deployment process of one or more components of sub-system 1100, in accordance with one or more embodiments of the present disclosure.

In embodiments, one or more CLA trackers and cloud processing is deployed within sub-system 1100. For example, one or more trackers are configured to collect data associated with a scale operation. By way of another example, one or more signals may be transmitted based on an identified trigger (e.g., entity leaving the field) found in the collected data from the one or more trackers. By way of another example, a CLA engine may be configured to determine a load origin probability distribution in real-time in response to an identified trigger. By way of another example, a cloud database may be configured to receive a set of data associated with the scale operatoins including, but not limited to, load origin probabilities, entity metadata, installation context, load tickets, and the like.

In embodiments, sub-system 1100 includes one or more local components configured for the storage of data associated with the scale operation (e.g., installation context, load origin probabilities, entity metadata, scale tickets, and the like). For example, sub-system 1100 may include a message queueing telemetry transport (MQTT) message broker. The MQTT message broker may be designed for constrained devices and low-bandwidth, high-latency, or unreliable networks. In embodiments, data associated with the scale operations may be synced to a local HALO controller 112. In embodiments, the scale interface or other components may transmit data messages, which the HALO appliance receives and processes for local synchronization. In embodiments, partial storage of the site-relevant data may be stored in a local database.

In embodiments, sub-system 110 includes an interface (e.g., API) for the scale application actions. For example, the interface may include a web backend server. The web backend server the part of sub-system 1100 that is responsible for managing and processing data and business logic. It operates behind the scenes and communicates with the front end (e.g., user interface) that users interact with. The backend server handles tasks such as data storage, retrieval, and manipulation, user authentication, and overall application functionality.

In embodiments, the sub-system 1100 includes an automation process. For example, the automation process may include a set of rules and components associated with an automatic ticket opening and closing process. In embodiments, the automated ticket opening process includes a series of events occurring prior to the generation of a ticket. For example, the automation process begins when a specific event or trigger occurs (e.g., an entity on a scale is identified) . By way of another example, data associated with the operation (e.g., timestamps, system status, entity information, and the like) may be automatically collected. By way of another example, one or more processors 114 may be configured to apply one or more rules to the collected data to determine if a new ticket should be generated. By way of another example, the one or more processors 114 may be configured to automatically generate a new ticket in response to the one or more rules being satisfied. In embodiments, the automated ticket closing process includes a series of events occurring prior to the closing of a ticket. For example, similar to the ticket opening process, one or more processors 114 may establish one or more rules for determining when a ticket can be considered resolved. These conditions may include, but are not limited to, time elapsed, actions taken, targets achieved, and the like. By way of another example, the one or more processors 114 may close the ticket in response to detecting that the one or more established rules have been resolved. By way of another example, the one or more processors may send an alert to a user to confirm the closure. By way of another example, data associated with the closed ticket may be stored by the sub-system 1100 for subsequent reference and analysis.

In embodiments, sub-system 1100 includes one or more devices for detecting the presence of an entity on a scale. For example, the one or more devices may include, but are not limited to, an RFID-based sensor, two or more antennas, and any other sensing device for truck presence detection known in the art. By way of another example, the one or more devices for detecting the presence of the entity on the scale may be configured to communicate with the MQTT message broker.

In embodiments, sub-system 1100 includes a data handling process. For example, the data handling process may include an interface (e.g., ZM405 serial to USB interface), active data filtering, and settling detection.

In embodiments, a ZM405 serial to USB interface facilitates communication between the scale and the USB interface of the sub-system. For example, the ZM405 may convert the serial data from the scale into a format that can be understood by the USB port on the system.

In embodiments, one or more processors 114 may generate one or more steps for filtering the data received from the scale. For example, the data received from the scale may include noise, fluctuations, or inaccuracies due to a variety of factors. By way of another example, the one or more steps may include a noise reduction step to remove or reduce unwanted noise and disturbances in the weight data. By way of another example, the one or more steps may include a smoothing technique that eliminates spikes in the weight readings.

In embodiments, one or more processors are configured to determine a settling time. The settling time may refer to the duration it takes for the scale readings to stabilize after a load is placed on the scale platform. For example, one or more processors 114 may be configured to analyze the weight data over time and determine when a scale reading has settled. By way of another example, one or more threshold values may be utilized by the one or more processors 114 to help determine when a scale reading is considered stable.

FIGS. 12-17 generally illustrate visualizations for providing operational tracking insights, in accordance with one or more embodiments of the present disclosure. It is contemplated herein that the visualizations depicted in FIGS. 12-17 may illustrate one or more embodiments, elements, statistics, spatial relationships, or operations of the present disclosure. In this regard, it is contemplated that the visualizations in FIGS. 12-17 may illustrate and/or display any data collected and/or analyzed by the present disclosure. It is further noted, however, that the visualizations depicted in FIGS. 12-17 are for illustrative purposes only, and are not to be regarded as a limitation on the scope of the present disclosure.

It is contemplated herein that the visualizations depicted in FIGS. 12-17 may be displayed on one or more components of the present disclosure. For example, the visualizations depicted in FIGS. 12-17 may be displayed on one or more communication devices and/or a user interface 118 of system 100. In this regard, a user may view, filter, edit and modify one or more characteristics of system 100 in response to the displayed visualizations depicted in FIGS. 12-17.

Figure 12:
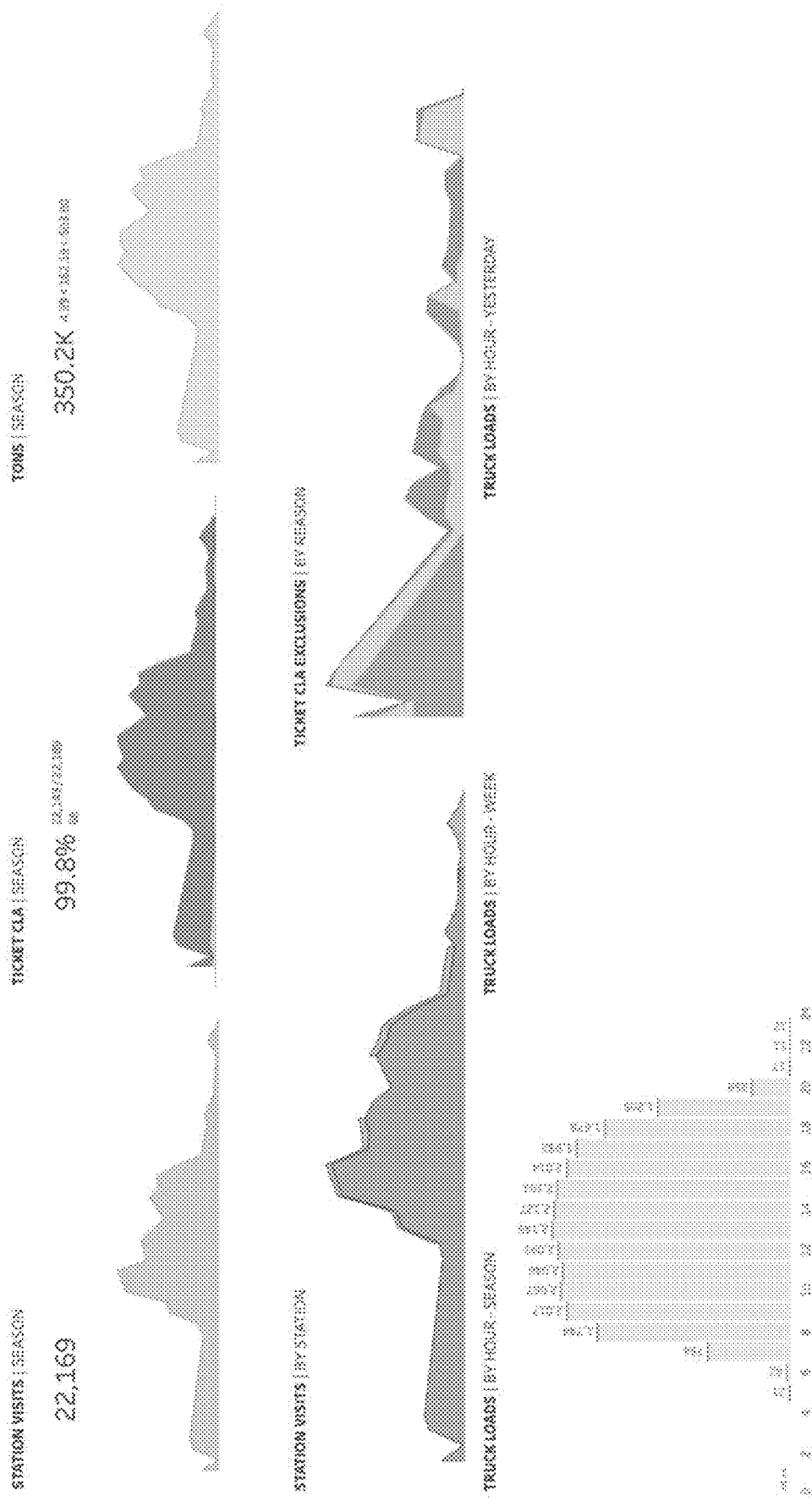
FIGS. 12-17 illustrate visualizations of operational tracking insights, in accordance with one or more embodiments of the present disclosure.
Figure 12:
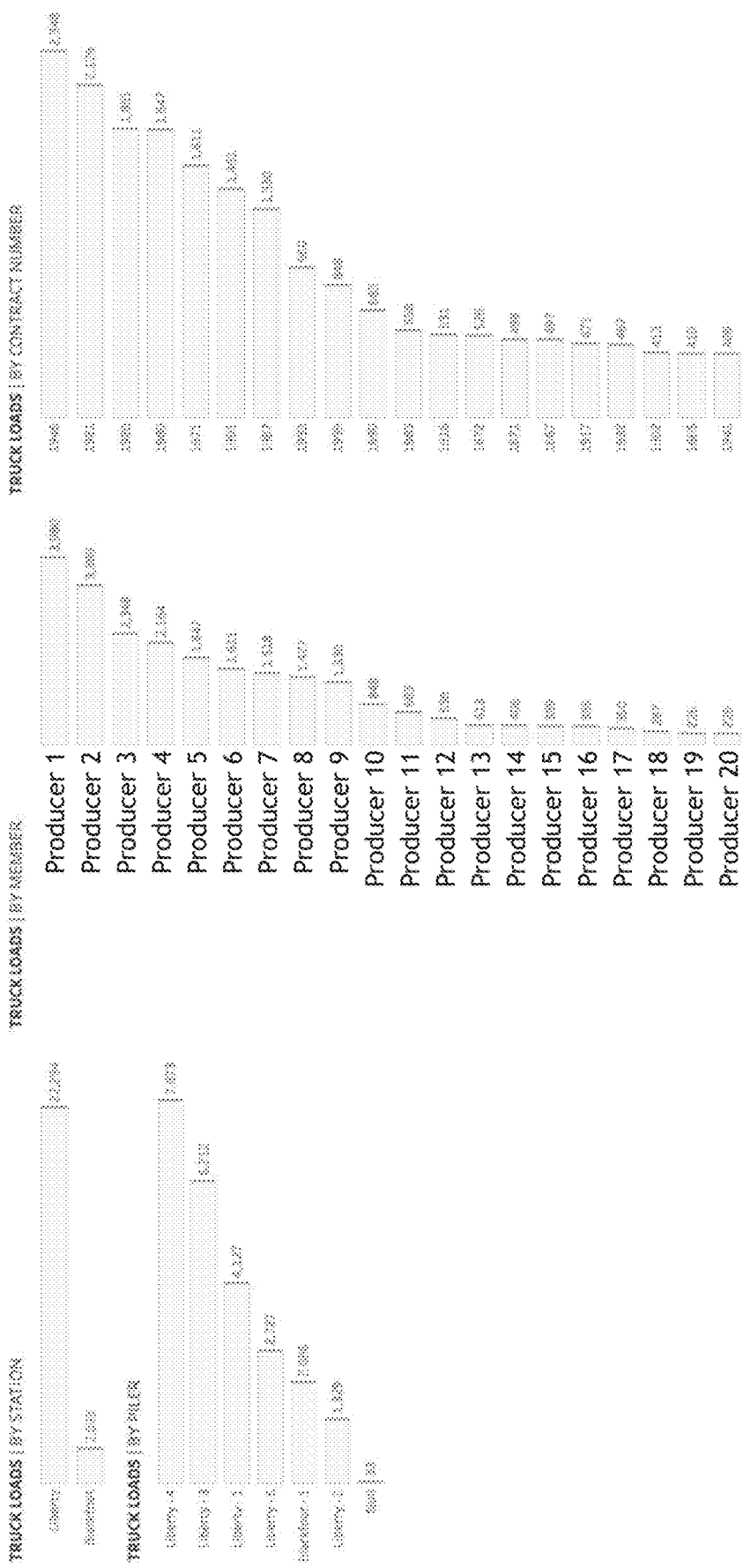

FIG. 12. illustrates a visualization 1200 for providing operational tracking insights, in accordance with one or more embodiments of the present disclosure.

In embodiments, visualization 1200 illustrates a report generated for an operation manager. For example, the report may include, but is not limited to, station visits in a season, ticket CLA percentage, weight of loads (in tons), station visits by station, ticket CLA executions, truck loads (e.g., in a season, by station, by piler, by member, or by contract number). By way of another example, a user may be able to filter the report using one or more filters including, but not limited to, date, time, operation, geo-fenced area (e.g., "field"), and the like.

Figure 13:
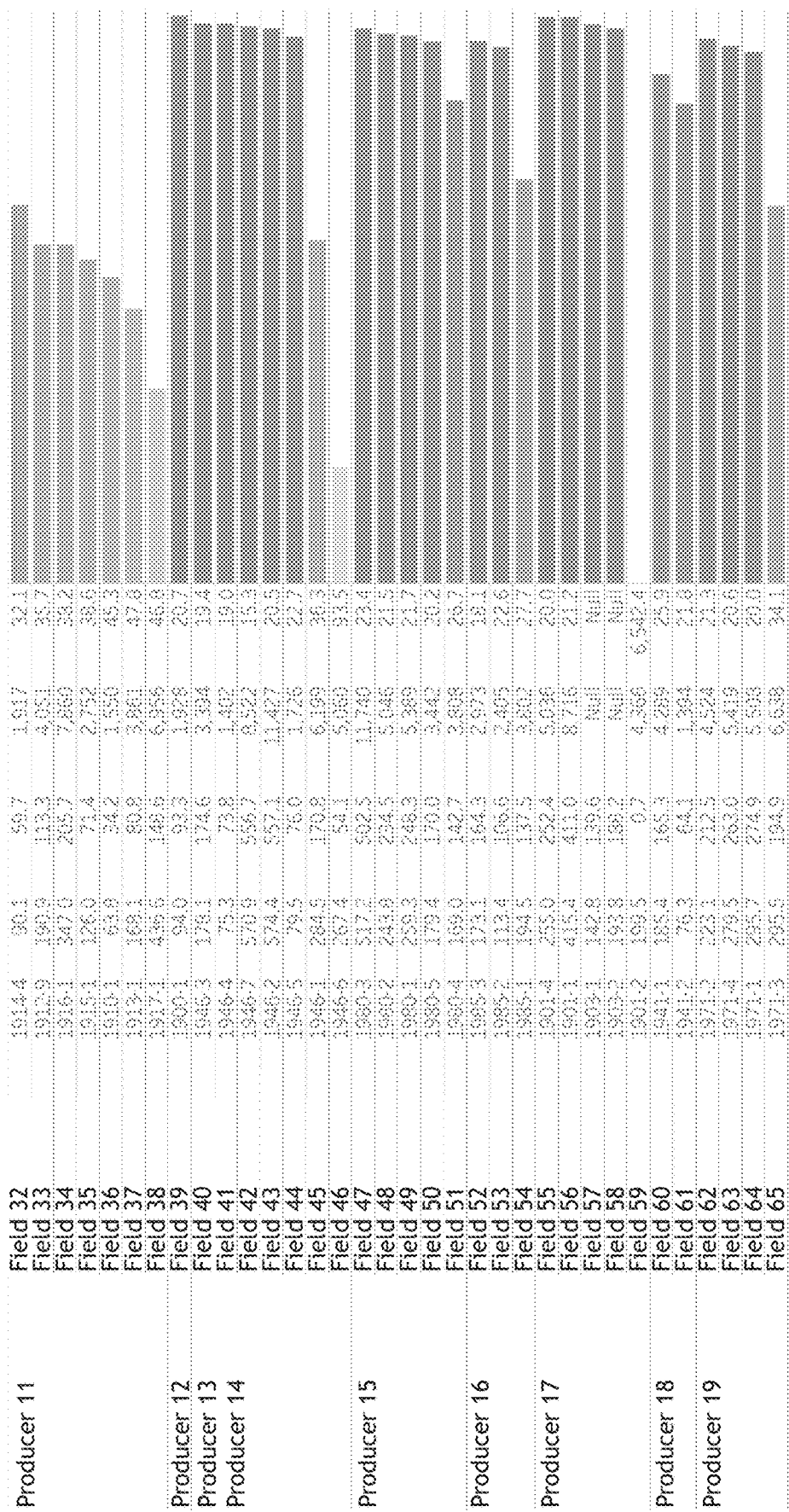

FIG. 13. illustrates a visualization 1300 for providing operational tracking insights, in accordance with one or more embodiments of the present disclosure.

In embodiments, visualization 1300 illustrates a report generated for an operation (e.g., harvesting) tracked by system 100 (e.g., "operation report"). For example, an operation report may include, but is not limited to, member name, field name, contract display, maximum field acres, maximum acres operated on, maximum ticket weight of a first net (in tons), ticket weight of as second net (in tons/acre), and the like.

Figure 14:
Figure 14:
Figure 14:

FIG. 14. illustrates a visualization 1400 for providing operational tracking insights, in accordance with one or more embodiments of the present disclosure.

In embodiments, visualization 1400 illustrates a report generated for efficiency of a vehicle tracked by system 100 (e.g., "efficiency report"). For example, the efficiency report may include, but is not limited to, a member name, a vehicle identifier, and efficiency metrics.

Figure 15:
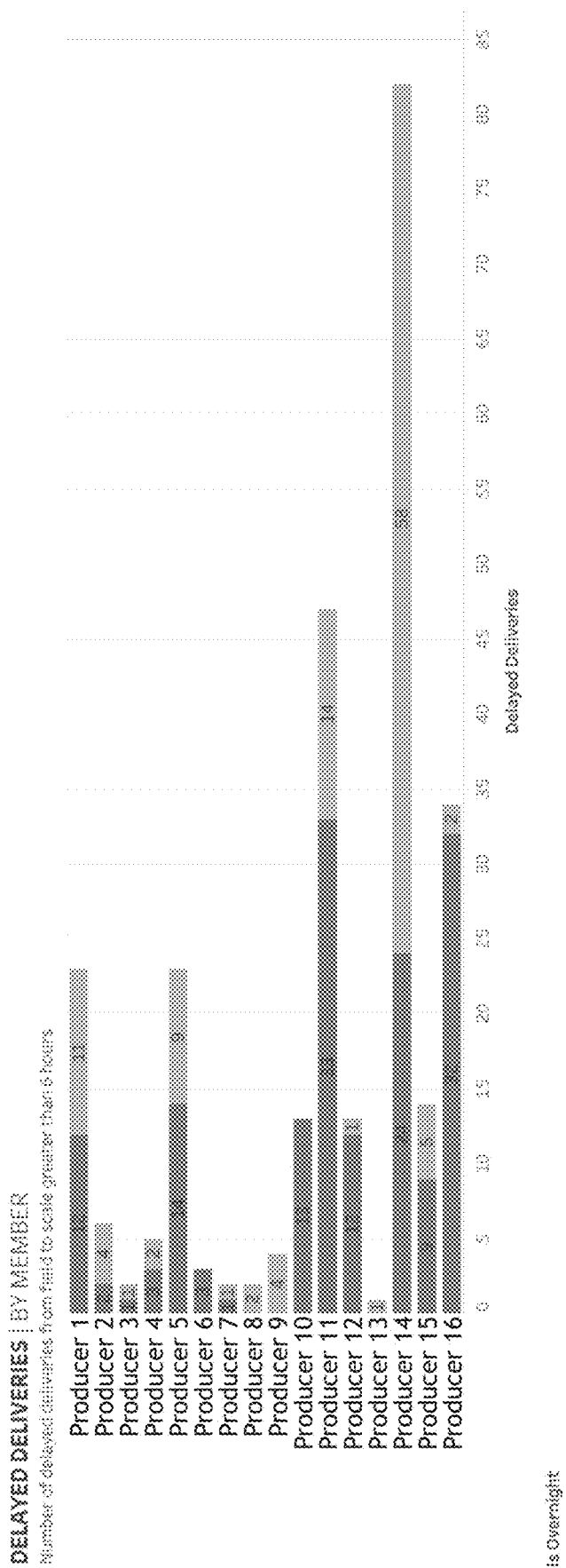
Figure 15:
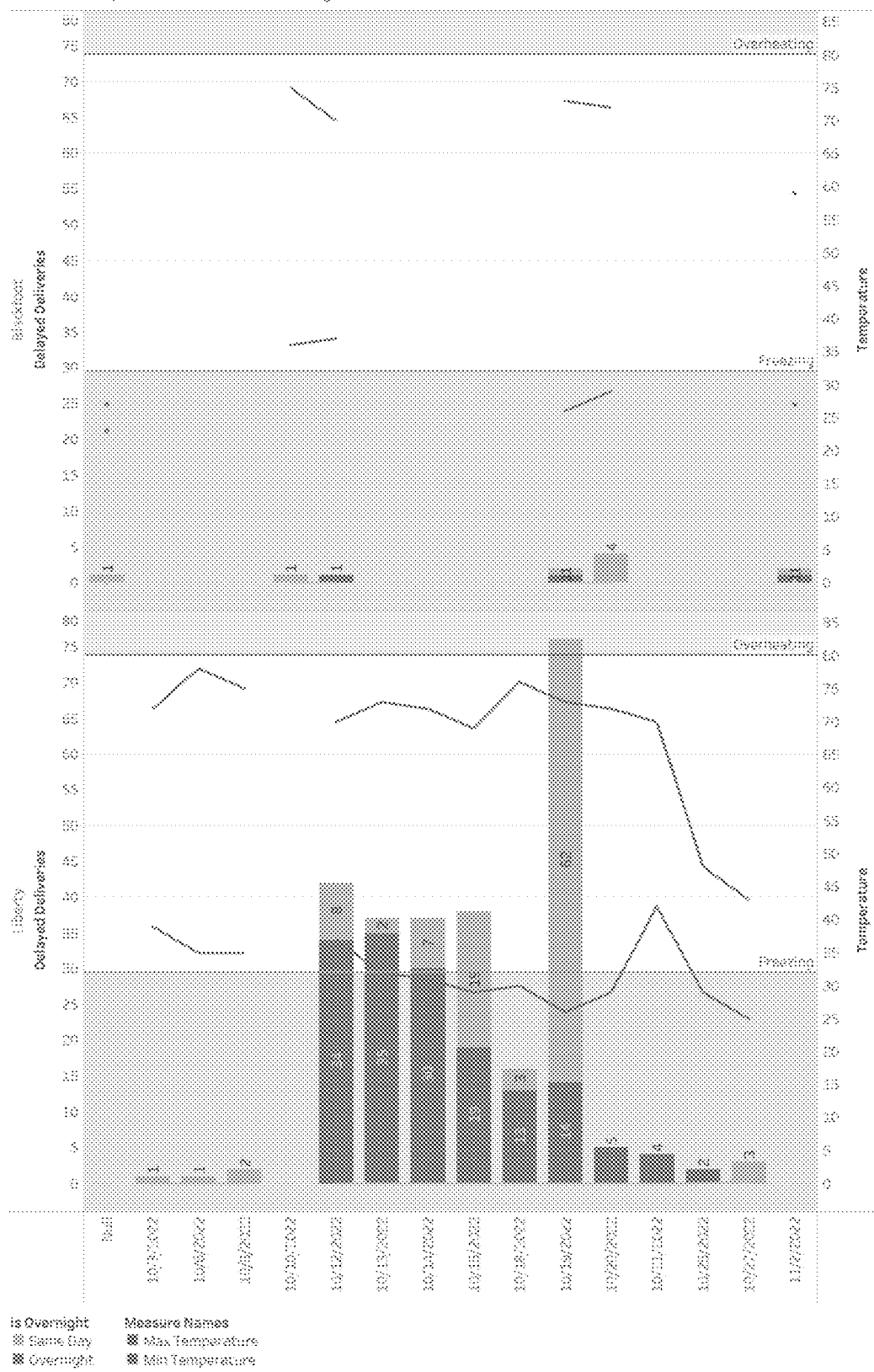

FIG. 15. illustrates a visualization 1500 for providing operational tracking insights, in accordance with one or more embodiments of the present disclosure.

In embodiments, visualization 1500 illustrates a report generated for identifying deliveries that took longer than an expected time (e.g., "delayed report"), which is tracked by system 100. For example, the delayed report may include, but is not limited to, member names, number of delayed deliveries from field to scale (e.g., if greater than 6 hours), same day or overnight delivery, weather data associated with a delayed delivery (e.g., maximum temperature, minimum temperature, precipitation, and the like).

Figure 16:
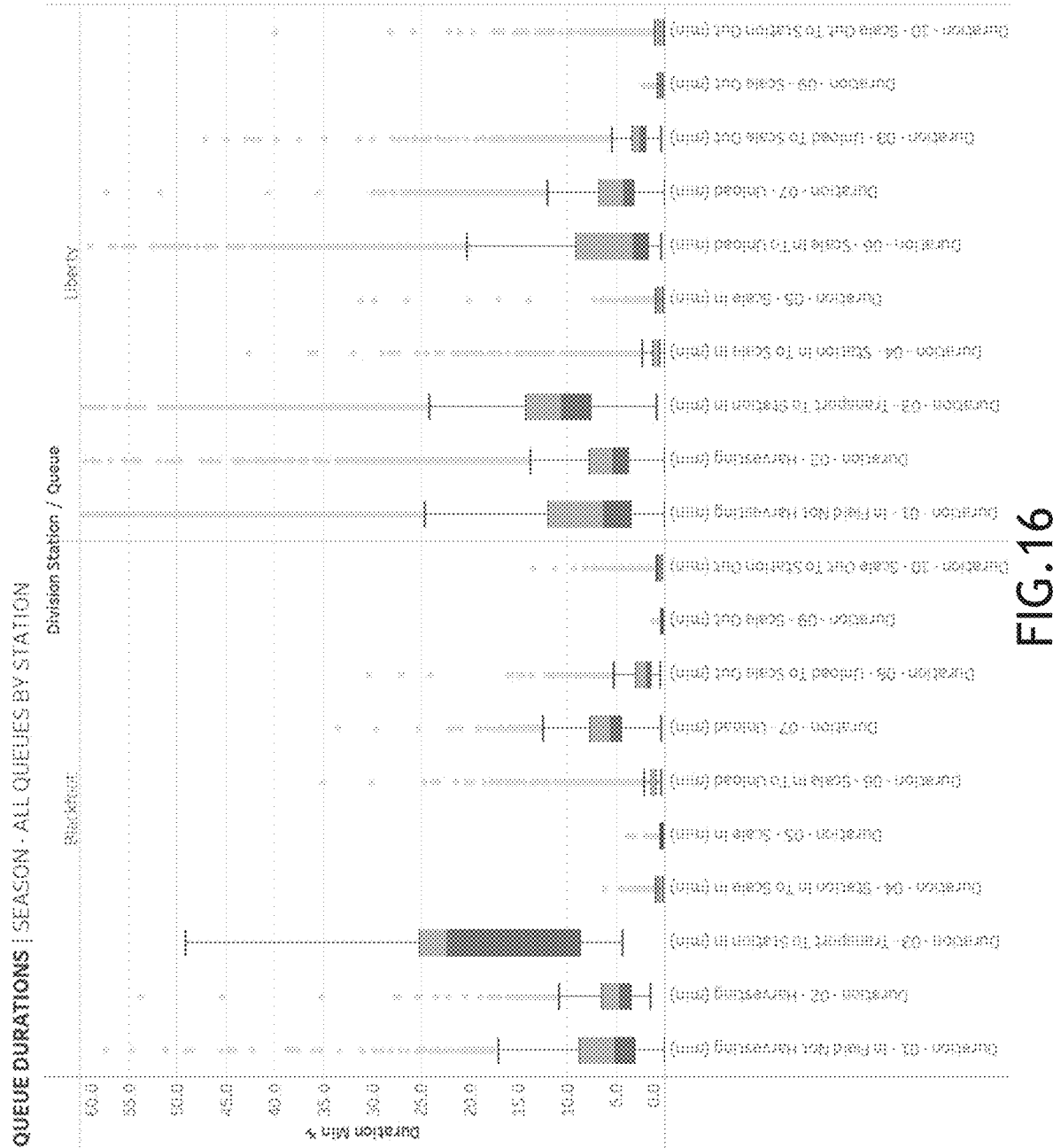

FIG. 16. illustrates a visualization 1600 for providing operational tracking insights, in accordance with one or more embodiments of the present disclosure.

In embodiments, the visualization 1600 illustrates a report generated for displaying queue cycles 204 (e.g., queue duration (in minutes)) associated with a station, which is tracked by system 100. For example, the report may include, but is not limited to, one or more stations, one or more operations associated with a station, and an associated queue duration for each operation. By way of another example, the report may include, but is not limited to, display a cat and whisker plot of the queue durations at each station.

Figure 17:
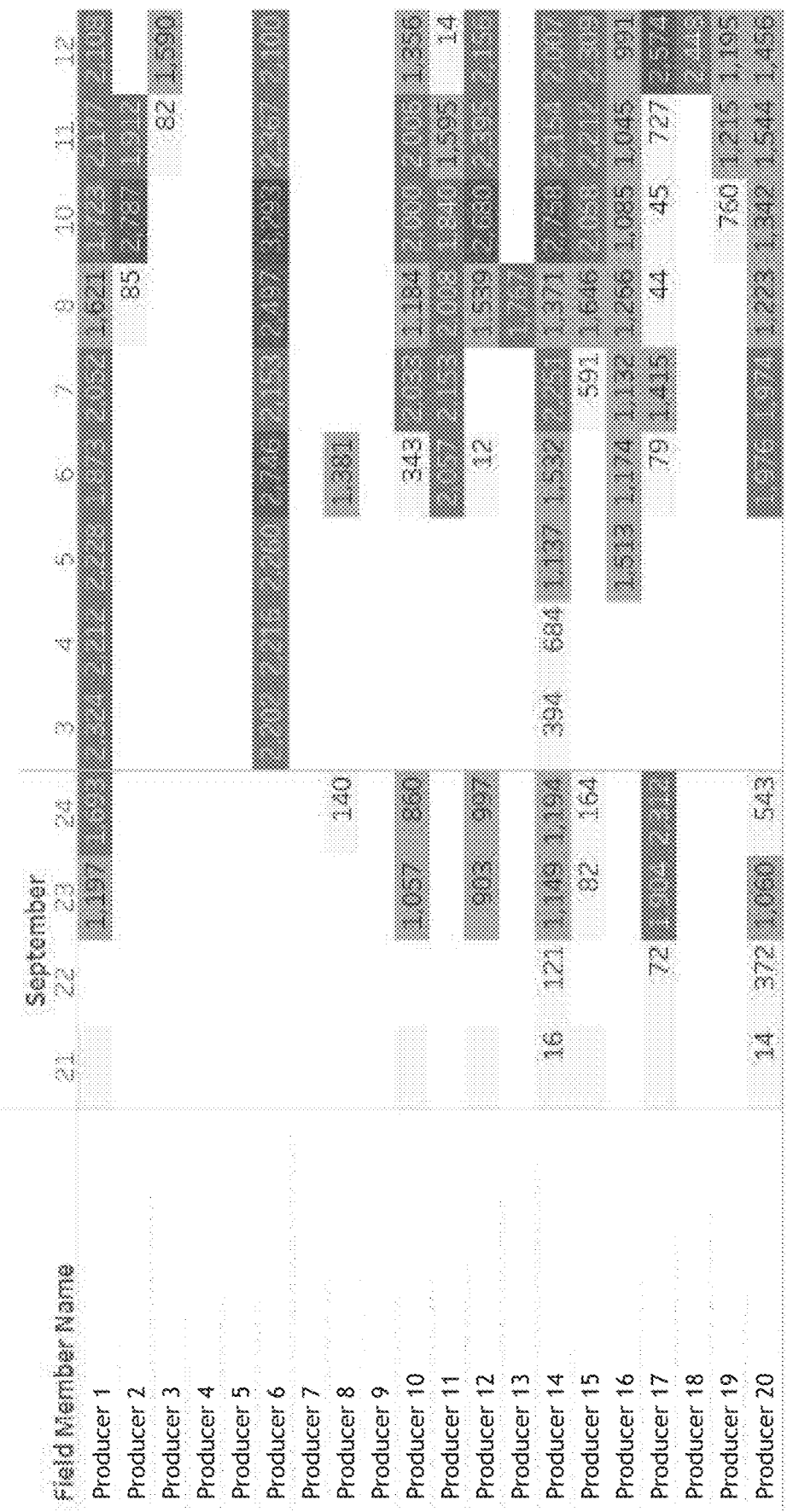
Figure 17:
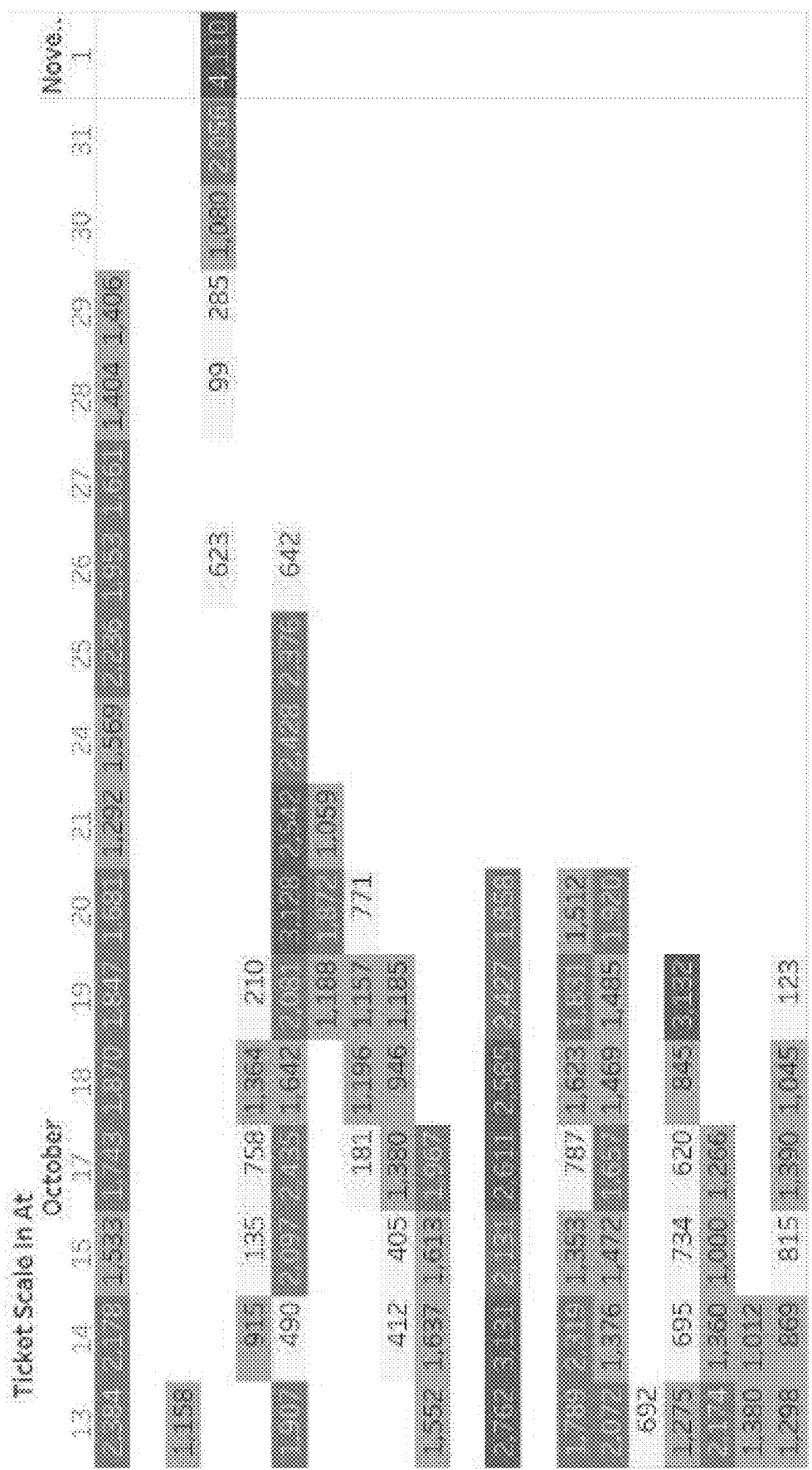
Figure 17:
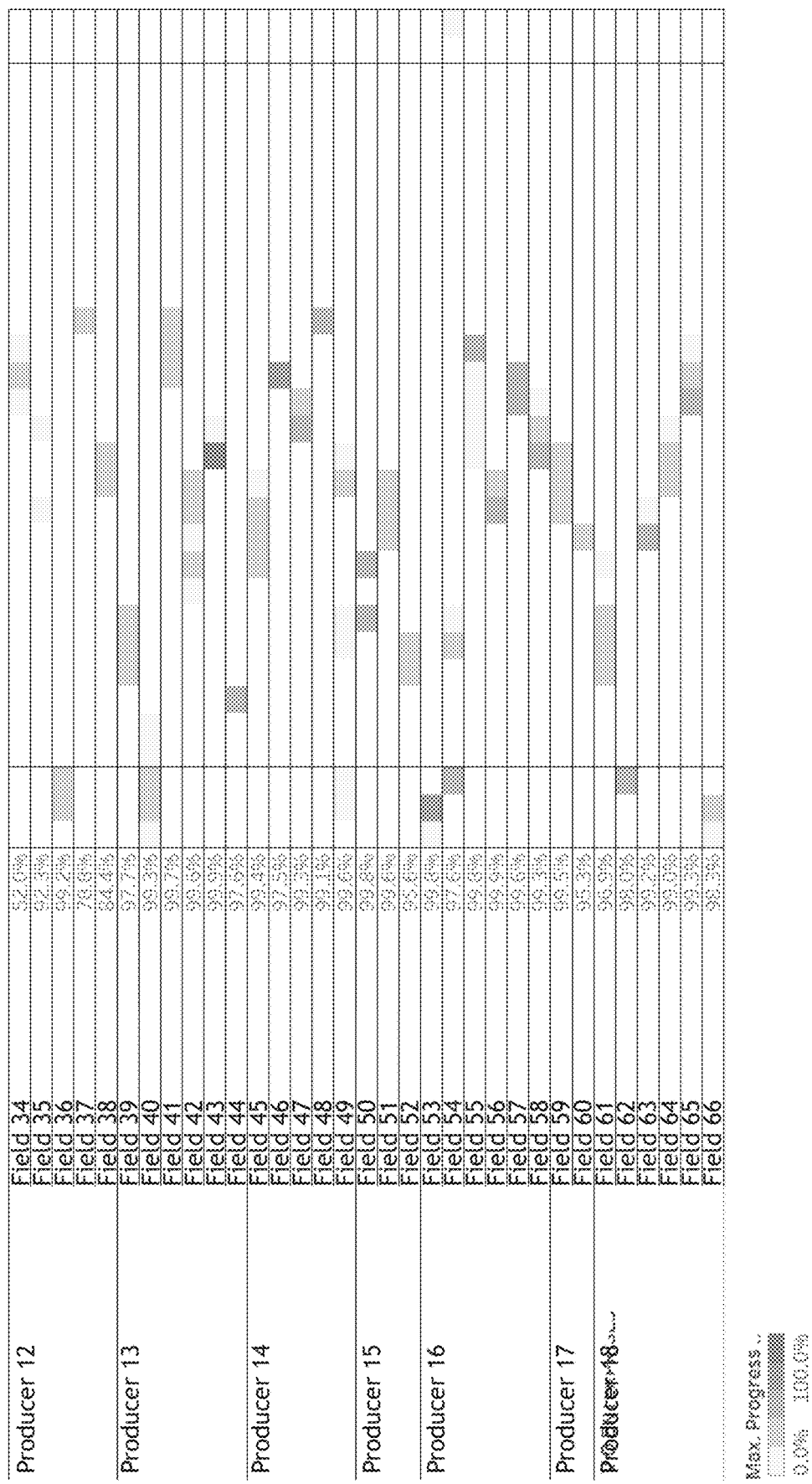

FIG. 17. illustrates a visualization 1700 for providing operational tracking insights, in accordance with one or more embodiments of the present disclosure.

In embodiments, the visualization 1700 illustrates a report generated for displaying the yield and progress of an operation, tracked by the system 100. For example, the report may include, but is not limited to, a member name, a schedule (e.g., calendar), a yield (e.g., tonnage value) associated with the member, and a daily progress percentage associated with a field name and a member.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," "temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims

What is claimed:

1. A system comprising:
a server comprising a memory and one or more processors, wherein the one or more processors are configured to:
receive one or more signals from one or more sensors, the one or more signals comprising data associated with one or more characteristics of one or more entities, the one or more characteristics comprising at least one of time-stamp and geospatial data;
generate one or more event blocks based on the received one or more signals;
generate a set of queue cycles, wherein each queue cycle of the set of queue cycles comprises at least a starting event block candidate and an ending event block candidate;
receive a set of evidence artifacts associated with an occurrence of a specific event of a particular process;
perform a correlation analysis between the set of queue cycles and the set of evidence artifacts, wherein each artifact of the set of evidence artifacts is compared to each queue cycle of the set of queue cycles to assign a correlation score for each evidence artifact-queue cycle pair;
determine a representative queue cycle by identifying the queue cycle having a highest correlation score; and
store the representative queue cycle and the corresponding evidence artifact in a database for subsequent retrieval.

2. The system of claim 1, wherein the set of queue cycles comprises a first queue cycle and at least a second queue cycle.

3. The system of claim 2, wherein the first queue cycle includes at least a first starting event block candidate and a first ending event block candidate.

4. The system of claim 2, wherein the at least the second queue cycle includes at least a second starting event block candidate and a second ending event block candidate.

5. The system of claim 1, wherein some of the set of queue cycles include one or more intermediate event blocks occurring between the starting event block candidate and the ending event block candidate.

6. The system of claim 1, wherein the one or more processors are further configured to automatically assign one or more loads to a contract based on the stored representative queue cycle and the corresponding evidence artifact.

7. The system of claim 6, wherein the one or more contracted loads are received at a field by the one or more entities and delivered to a delivery site where the one or more entities are weighed via a scale.

8. The system of claim 7, wherein the one or more contracted loads are defined by a quantity of a commodity, the quantity of the commodity measured in bushels.

9. The system of claim 1, wherein the one or more processors are further configured to:
receive global positioning system data associated with at least one of the one or more event blocks or the set of evidence; and
identify an origin of one or more loads within a predefined geospatial boundary based on the received global positioning system data.

10. The system of claim 9, wherein the predefined geospatial boundary is based on at least one of a device location, proximity to other devices, or equipment activity.

11. The system of claim 1, wherein the one or more sensors are configured to sense at least one of a vibration, a global positioning, level, volume, or weight data associated with one or more loads.

12. The system of claim 1, wherein the one or more processors are further configured to automatically predict an inventory level based on one or more characteristics associated with a load, the one or more characteristics comprising at least one of the load and corresponding scale activity, the load and corresponding position in the queue cycle, a container size, one or more characteristics of the container, one or more material properties of the load, or one or more environmental properties.

13. The system of claim 12, wherein the one or more processors are further configured to automatically predict the geospatial areas based on the one or more characteristics of the load.

14. The system of claim 1, wherein the one or more processors are further configured to estimate a quality value associated with a transportation of one or more loads based on at least one of a geospatial load assignment determined by at least one of equipment location, environmental conditions, and sensor-based properties.

15. The system of claim 14, wherein the one or more processors are further configured to:
assign the one or more loads to one or more locations based on the estimated quality value;
create one or more quality maps that visualize quality metrics of the assigned loads;
automatically generate a notification based on an out-of-specification load; and
automatically transfer inventories based on defined queue cycles and proximity-based data from the one or more sensors.

16. The system of claim 14, wherein the one or more processors are further configured to generate a route for the one or more loads based on the quality value associated with the load.

17. The system of claim 1, wherein the one or more processors are further configured to:
assign one or more loads to a location of origin associated with a field based on the geospatial data received via the one or more signals;
receive a weight associated with the one or more loads from the one or more sensors; and
generate a yield map by applying the weight of the one or more loads to the corresponding locations of origin.

18. The system of claim 17, wherein the one or more sensors include at least one of a sensor coupled to a harvester, a sensor coupled to a commodity cart, a sensor coupled to a truck, or a sensor coupled to a camera.

19. The system of claim 17, wherein the one or more processors are further configured to:
    determine a level of risk associated with the one or more loads based on the location of origin;
    flag at least one of the one or more loads for inspection based on the associated level of risk; and
    automatically generate a notification, based on the flagged one or more loads.

20. The system of claim 19, wherein the notification comprises one or more directions, for a user, to dump the one or more loads at a specified location.

21. The system of claim 19, wherein the notification comprises information that the one or more loads have been rejected.

22. The system of claim 19, wherein the notification comprises one or more directions, for a user, to quarantine the one or more loads.

23. The system of claim 1, wherein the one or more processors are further configured to:
    receive one or more vehicle properties of the one or more entities, the vehicle properties comprising at least one of a speed, acceleration, and vibration level;
    analyze a utilization of the one or more entities based on the received one or more vehicle properties, the utilization comprising at least one of an off state, an idle state, and an active state; and
    generate at least one usage report including an efficiency score for each of the one or more entities.

24. The system of claim 1, wherein the one or more processors are further configured to:
    receive at least one of a source location and a delivery location associated with one or more loads, the one or more loads associated with one or more entities;
    receive activity data associated with movement patterns of the one or more entities; and
    determine a confidence level associated with a delivery of the one or more loads based on at least one of the source location, the delivery location, and the activity data.

25. The system of claim 24, wherein the one or more processors are further configured to:
    assign an application to a geofenced area based on the confidence level associated with the delivery of the one or more loads; and
    determine a volume of the one or more loads applied based on the activity data and one or more known material properties associated with the one or more loads.

26. The system of claim 1, wherein the one or more processors are further configured to:
    receive one or more properties associated with one or more delivered loads, the one or more delivered loads associated with the one or more entities;
    determine a weight of the delivered one or more loads associated with the one or more entities;
    determine an area of application of the one or more delivered loads based on an assumed even distribution of the one or more delivered loads; and
    determine an average weight applied per unit of area within the area of application.

27. The system of claim 1, wherein the one or more processors are further configured to train a machine learning model based on a plurality of the stored representative queue cycles and the evidence artifact.

28. The system of claim 1, wherein a queue cycle having a correlation score below a predefined threshold is rejected.

29. The system of claim 1, wherein the set of evidence artifacts comprises substitute evidence, the substitute evidence including at least one of timestamped occurrence data or entity identification data.

30. The system of claim 1, wherein the entity is moveable.

31. The system of claim 30, wherein the entity comprises at least one of a vehicle, a trailer, an implement, or other work attachment.

32. The system of claim 1, wherein the one or more processors are further configured to automatically predict and verify at least one of an activity, operation, or standard operating procedure based on the representative queue cycle.

33. The system of claim 1, wherein the one or more processors are further configured to provide an alert to a user via a user interface based on one or more characteristics of the representative queue cycle.

34. The system of claim 1, wherein the one or more processors are further configured to utilize at least one of scale weight data, global positioning system data, automated image recognition data, or wireless identification data to automate a confirmation of one or more delivered loads.

35. The system of claim 1, wherein the one or more processors are further configured to utilize redundant data to automate a confirmation of one or more delivered loads for fool-proofing an automated payment to a user.

36. The system of claim 1, wherein the one or more processors are further configured to automatically predict an out-of-process activity.

37. The system of claim 1, wherein the one or more processors are further configured to generate an alert in response to an out-of-process activity.

38. A system comprising:
    one or more sensors configured to collect data associated with one or more characteristics of one or more entities; and
    a server comprising a memory and one or more processors, wherein the one or more processors are configured to:
        receive one or more signals from the one or more sensors, the one or more signals comprising data associated with one or more characteristics of one or more entities, the one or more characteristics comprising at least one of time-stamp and geospatial data;
        generate one or more event blocks based on the received one or more signals;
        generate a set of queue cycles, wherein each queue cycle of the set of queue cycles comprises at least a starting event block candidate and an ending event block candidate;
        receive a set of evidence artifacts associated with an occurrence of a specific event of a particular process;
        perform a correlation analysis between the set of queue cycles and the set of evidence artifacts, wherein each artifact of the set of evidence artifacts is compared to each queue cycle of the set of queue cycles to assign a correlation score for each evidence artifact-queue cycle pair;
        determine a representative queue cycle by identifying the queue cycle having a highest correlation score; and
        store the representative queue cycle and the corresponding evidence artifact in a database for subsequent retrieval.

39. A method comprising:
- receiving one or more signals from one or more sensors, the one or more signals comprising data associated with one or more characteristics of one or more entities, the one or more characteristics comprising at least one of time-stamp and geospatial data;
- generating one or more event blocks based on the received one or more signals;
- generating a set of queue cycles, wherein each queue cycle of the set of queue cycles comprises at least a starting event block candidate and an ending event block candidate;
- receiving a set of evidence artifacts associated with an occurrence of a specific event of a particular process;
- performing a correlation analysis between the set of queue cycles and the set of evidence artifacts, wherein each artifact of the set of evidence artifacts is compared to each queue cycle of the set of queue cycles to assign a correlation score for each evidence artifact-queue cycle pair;
- determining a representative queue cycle by identifying the queue cycle having a highest correlation score; and
- storing the representative queue cycle and the corresponding evidence artifact in a database for subsequent retrieval.

* * * * *